United States Patent
Wisler et al.

(10) Patent No.: US 6,272,434 B1
(45) Date of Patent: Aug. 7, 2001

(54) DRILLING SYSTEM WITH DOWNHOLE APPARATUS FOR DETERMINING PARAMETERS OF INTEREST AND FOR ADJUSTING DRILLING DIRECTION IN RESPONSE THERETO

(75) Inventors: Macmillan H. Wisler, Kingwood; Wallace H. Meyer, Spring; Daniel Minette, The Woodlands; Ronald deady, Houston; James V. Leggett, III, Houston; Herbert W. Beimgraben, Houston; Bernard G. Hubner, The Woodlands, all of TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/494,955

(22) Filed: Feb. 1, 2000

Related U.S. Application Data

(63) Continuation of application No. 09/156,767, filed on Sep. 18, 1998, now abandoned, which is a continuation of application No. 08/570,838, filed on Dec. 12, 1995, now Pat. No. 5,812,068, which is a continuation-in-part of application No. 08/354,276, filed on Dec. 12, 1994, now abandoned, and a continuation-in-part of application No. 08/371,882, filed on Jan. 12, 1995, now abandoned.

(51) Int. Cl.[7] .................................................. G01V 3/38
(52) U.S. Cl. ........................................... 702/9; 702/11
(58) Field of Search .................................. 702/9, 7, 8, 6, 702/10, 11, 12, 13; 367/73; 324/338, 339, 356, 369; 73/152.05, 152.06, 152.03

(56) References Cited

U.S. PATENT DOCUMENTS 5,473,158 * 12/1995 Holenka et al. ...................... 250/254
5,581,024 * 12/1996 Meyer, Jr. et al. ................ 73/152.03

* cited by examiner

Primary Examiner—Donald E. McElheny, Jr.
(74) Attorney, Agent, or Firm—Madan, Mossman & Sriram, P.C.

(57) ABSTRACT

The present invention provides a measurement-while-drilling (MWD) system having a downhole computer and multiple downhole sensors. Relatively large amounts of basic or "raw" data are measured by downhole sensors, and these data are processed within a downhole computer to be reduced to parameters of interest, which may be utilized to control the drilling operation by downhole devices, stored downhole, telemetered to the surface, or both. The measurements may be correlated downhole with stored reference data thereby providing additional information pertaining to the drilling operation. Downhole depth correlation between downhole measured parameters may be made by utilizing surface determined or downhole determined borehole depth.

81 Claims, 12 Drawing Sheets

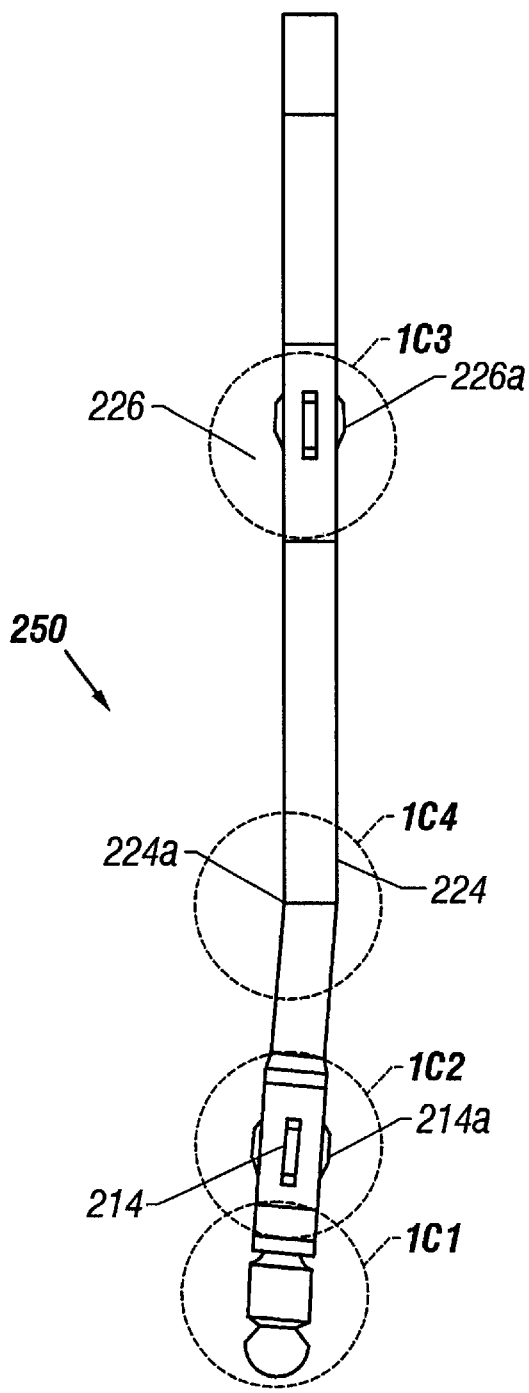
FIG. 1C
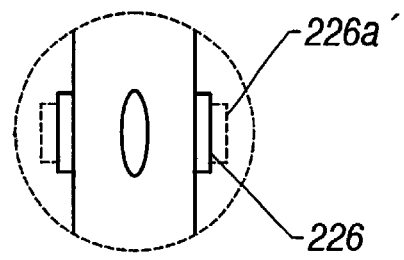
FIG. 1C3
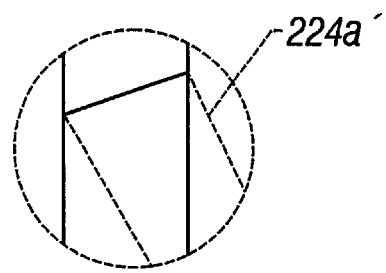
FIG. 1C4
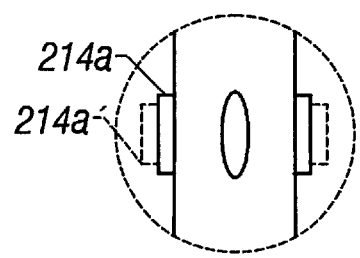
FIG. 1C2
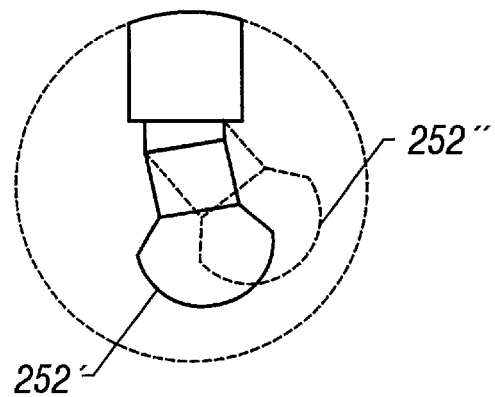
FIG. 1C1

DRILLING SYSTEM WITH DOWNHOLE APPARATUS FOR DETERMINING PARAMETERS OF INTEREST AND FOR ADJUSTING DRILLING DIRECTION IN RESPONSE THERETO

CROSS REFERENCE TO RELATED APPLICATIONS

This application is a continuation of U.S. application Ser. No. 09/156,767, filed Sep. 18, 1998, now abandoned, and U.S. application Ser. No. 08/570,838, filed Dec. 12, 1995, now issued U.S. Pat. No. 5,812,068, issued Sep. 22, 1998.

This application is a continuation-in-part of the U.S. patent application Ser. No. 08/354,276, filed on Dec. 12, 1994, now abandoned, and a continuation-in-part of the U.S. patent application Ser. No. 08/371,882, filed on Jan. 12, 1995, now abandoned.

BACKGROUND OF THE INVENTION

1. Field of the Invention

The present invention relates generally to drilling systems and more particularly to a system of drilling boreholes having a measurement-while-drilling ("MWD") system wherein drilling and formation data and parameters determined from various downhole measuring devices are transformed downhole into selected parameters of interest or "answers" which are telemetered to the surface or stored downhole for subsequent retrieval or both. In an alternate embodiment, measurements are depth-correlated, utilizing depth measurements made downhole for improving accuracy of the measurements and the parameters of interest. The measurements and/or parameters are also correlated with stored reference data for providing additional information pertaining to the drilling operations and the formation characteristics. The system also is adapted to determine the drill bit location relative to the desired drilling path and to adjust the drilling activity downhole based on such determination.

2. Background of the Art

To obtain hydrocarbons such as oil and gas, boreholes are drilled by rotating a drill bit attached at a drill string end. A large proportion of the current drilling activity involves directional drilling, i.e., drilling deviated and horizontal boreholes to increase the hydrocarbon production and/or to withdraw additional hydrocarbons from the earth's formations. Modern directional drilling systems generally employ a drill pipe having a drill bit at the bottom that is rotated by a drill motor (commonly referred to as the "mud motor"). Pressurized drilling fluid (commonly known as the "mud" or "drilling mud") is pumped into the drill pipe to rotate the drill motor and to provide lubrication to various members of the drill string including-the drill bit. As required the drill pipe is rotated by a prime mover, such as a motor, to facilitate directional drilling and to drill vertical boreholes.

A plurality of downhole devices are placed in close proximity to the drill bit to measure formation properties, downhole operating parameters associated with the drill string and to navigate the drill bit along a desired drill path. Downhole devices, frequently referred to as the measurement-while-drilling ("MWD") devices, are typically coupled between the drill bit and the drill pipe along with the mud motor, kick-off device and stabilizers. For convenience, all such devices are collectively sometimes referred herein as the "downhole subassembly." The MWD devices typically include sensors for measuring downhole temperature and pressure, an inclination measuring device for determining the inclination of a portion of the drill string, a resistivity measuring device to determine the presence of hydrocarbons against water, and devices for determining the formation porosity, density and formation fluid conditions.

Prior to drilling a borehole, substantial information about the subsurface formations is obtained from seismic surveys, offset wells, and prior drilled boreholes in the vicinity of the current borehole. The borehole is then usually drilled along a predetermined path based upon such prior information. During the borehole drilling, the downhole subassembly transmits information about the various downhole parameters, which are typically analyzed and correlated with other parameters at the surface to decide whether the drilling path needs to be adjusted. To adjust the drilling path, the drill string is usually retrieved from the borehole and then certain mechanical devices, such as kick-off subassemblies and stabilizers, are adjusted to alter the drilling direction. Stopping the drilling operation and retrieving the drill string to adjust the drilling direction results in great expense. Additionally, surface-measured downhole depth of the drill bit is typically utilized to take corrective actions. Surface-measured depth readings rely on the drill pipe length, which over several thousand feet may have an error of several feet (15 to 50 feet) from the true location, which is highly undesirable, especially for horizontal drilling through relatively narrow formations. Thus, it is desirable to have a drilling system which provides more accurate measure of the depth of the downhole subassembly and means for adjusting the drilling direction without retrieving the drill string from the borehole.

The downhole subassembly usually transmits information about the various downhole parameters to the surface by an uplink telemetry via the mud column in the drill string or electromagnetic means. The current telemetry systems such as the mud-pulse telemetry systems are capable of transmitting typically one bit per second, which greatly limits the ability to transmit a vast amount of useful information about the downhole formations and downhole conditions to the surface during the drilling operation.

To accurately determine the properties of the formations along the borehole, such as porosity, permeability, hydrocarbon saturation and other geophysical properties and the borehole profile, the drilling activity is intermittently stopped, the drill string is retrieved and wireline logs are obtained by traversing wireline tools through the borehole. The wireline tools contain a set of downhole devices such as resistivity devices, porosity and permeability measuring devices and acoustic devices. Such devices transmit a vast amount of data relating to the formations and the downhole conditions via a high transmission rate telemeter system to the surface, where the data is transformed into certain parameters of interest, which parameters are then utilized to aid in the drilling of the borehole and to determine the formation lithology, producibility of the pay zones, etc. The wireline systems provide a method for conveying the devices in the borehole and means for transmitting data at very high data rates.

Current wireline systems contain multiple sensors and complex processing algorithms to determine formation properties along the borehole. Examples include electromagnetic sensors comprising multiple transmitters and multiple receivers which measure attenuation and phase shift of the transmitted signals as they traverse the formation. Acoustic sensors which measure attenuation, phase shift and the full wave form of acoustic signals traversing the formation and borehole are also used. Nuclear sensors are used to measure the natural gamma ray energy spectrum of the formation which is indicative of shale content, shale type and other parameters of interest. Nuclear sensors comprising chemical neutron or isotopic gamma ray sources and neutron or gamma ray detectors are used to measure a plurality of geophysical parameters. Pulsed neutron sources and gamma ray accelerators are used in other types of nuclear sensors. All of the aforementioned sensors used in the wireline tools are data intensive. When such measurements are made simultaneously with a single pass of a multiple sensor wireline device along the borehole, massive amounts of raw data are generated per depth interval of borehole traversed.

With some wireline systems, raw sensor data are transmitted to the surface of the earth over the logging cable for subsequent processing to obtain the multiple parameters of interest. As examples, current wireline telemetry systems using seven conductor electrical logging cable can telemeter data to the surface at a rate of 500 kilobits to 1000 kilobits per second. Use of fiber optic cables substantially increases the data transmission rate. Such wireline telemetry systems have large telemetry bandwidths which enable the use of multiple sensors and transmission of the data to the surface for processing.

However, in boreholes in which the pressure of the well is above atmospheric pressure at the surface, the logging cable must pass through a pressure-containing device known in the art as a "lubricator." The cross sectional area of current multiple conductor and fiber optic cables is such that the lubricator cannot contain surface well pressures of several thousand psi and still permit the cable to move freely through the lubricator. Single conductor cables have smaller cross-sectional areas which allow the lubricator to maintain pressure control and also allow the cable to move freely through the lubricator. Therefore, smaller diameter single-conductor cables are usually used in such high pressure wells. Telemetry bandwidths of single conductor wireline systems are substantially lower than those comprising seven conductors or fiber optic cables.

Simultaneous measurements using multiple, data-intensive sensors can generate amounts of raw data which exceed the telemetry capacities of single conductor wireline systems. As a result, the raw data is sometimes compressed before being telemetered to the surface, which results in a loss of vertical resolution of the measurements and/or a degradation in accuracy of the measurements. Vertical resolution and accuracy can be preserved by correlating multiple measurements downhole in such wireline systems.

Wireline logs from existing wells are frequently correlated to select locations and borehole profiles of subsequent wells. For example, log correlations often define the presence of faults and aid in the delineation and mapping of fault blocks. Log correlations can also reveal anomalies such as localized structures or "lenses" which might act as traps for hydrocarbons. However, such wireline correlations often do not reveal critical structural aspects of the field as will be illustrated and further discussed in subsequent sections of this disclosure. Correlation of measurements during drilling of the borehole can provide more accurate measure of such anomalies. It is therefore desirable to determine parameters of interest downhole and correlate such parameters of interest with prior well logs during the drilling operation.

Seismic data are frequently used in developing existing oil and gas fields. Seismic data are usually the prime source of information upon which decisions are based in choosing locations for exploratory or "wild cat" wells, but seismic data are also used in the development of existing fields. The correlation of well log data and seismic data can be used to detect structural anomalies which would go undetected with conventional well log correlation methods. The spatial resolution of seismic measurements is poor when compared to wireline measurements. Although well log and seismic correlations are used to select locations and target zones of development wells, poor spatial resolution presents a problem in defining the target formation with the accuracy and precision required by the driller. Correlation of downhole-computed parameters of interest with seismic data during drilling of the borehole can address some of these problems. The results may be stored downhole for later retrieval and/or selectively transmitted uphole during drilling of the borehole.

Thus, there is a great need to determine various parameters of interest downhole during the drilling of boreholes because massive data generated by the sensors cannot be transmitted uphole during the drilling operation. As noted earlier, wireline logs are typically made intermittently during the drilling operation and such logging requires that the drill string be removed from the borehole prior to logging. Logging after completion of the drilling operation often reveals that the target formation or formations have been missed. In addition, unexpected zones such as high pressure formations or salt zones, can be encountered during the drilling operation. These formations and zones can add costly delays to the drilling operation and endanger drilling personnel and equipment. Also, damage to the borehole can occur during logging and drilling rig time and logging equipment time is wasted during stand-by periods for each operation.

Many of the above-noted problems can be overcome by measuring various formation-evaluation and drilling parameters during the actual borehole drilling operation. Formation evaluation via measurements-while-drilling (MWD) logs combined with offset wireline logs and seismic data can provide, in real time, information on anomalies, such as fault planes or formation lenses. Such measurements can also indicate to the driller that high-pressure formations or salt zones are being penetrated, thereby giving the driller time to take remedial steps, such as adjusting the weight and salinity of the drilling fluid, before these zones adversely affect the drilling operation. Real-time measures of drilling dynamics data provide the driller with information concerning the efficiency of the drilling operation. Furthermore, borehole directional information, combined with real-time formation evaluation parameters, offset wireline log data and seismic data can be extremely useful in assisting the driller in reaching the targeted zone of interest. These and other applications involving the correlation of offset wireline data, seismic data and any other type of reference data with measurements made while drilling will be discussed further herein.

These MWD systems provided directional information and a limited number of formation evaluation type measurements. In the past decade, additional sensors and services have been added. In many respects, the sophistication of the sensors is comparable to their wireline counterparts in spite of the harsh environment experienced in using such sensors in the drilling environment. Current MWD systems do not combine multiple sensor measurements because current MWD telemetry does not have the capacity to simultaneously transmit a plurality of full acoustic wave forms or gamma ray energy spectra or electromagnetic wave attenuation and phase shift data, or a combination thereof, to the surface for processing to determine parameters of interest at intervals sufficient to obtain the required vertical resolution of the penetrated formations. The simultaneous transmission of drilling management sensor information such as directional information, weight on the drill bit, and other non formation evaluation type measurements further overloads current MWD telemetry transmission rates, which are of the order of 2 to 60 bits per second. Furthermore, it is not feasible to store copious amounts of raw downhole sensor data for subsequent retrieval and processing due to relatively limited storage capacity of current MWD systems.

MWD means for making multiple formation and borehole evaluation type parametric determinations comparable to current wireline measurements require the computation of the desired parameters downhole, and the transmission of the computed parameters of interest to the surface. By using downhole computational means and methods, the transmission requirements are reduced by orders of magnitude in that only "answers" are telemetered rather than raw data. This type of downhole computation is also applicable to other types of non-formation evaluation type measurements such as signals indicative of the operational characteristics of the downhole equipment as well as measurements indicative of drilling direction and efficiency.

There are numerous references in the prior art directed toward the measurement of formation parameters while drilling and the use of these measurements to "steer" the drill bit within a formation of specified characteristics. An exemplary system is disclosed in U.S. Pat. No. 5,163,521 to Randal H. Pustanky et al. One basic technique comprises the transmission of measured formation parameters to the surface in real-time thereby allowing the driller to compare measured and targeted formation parameters and to manually adjust the direction of drilling based upon this comparison by the use of directional commands from the surface. A second basic technique comprises the continuous comparison of measured and target formation parameters downhole and the automatic adjustment of the drilling direction based upon these comparisons. U.S. Pat. No. 5,332,048 to Lance D. Underwood et al teaches the measurement of geological parameters while drilling, the use of a downhole microcontroller which is preprogrammed with a desired range of formation characteristics or with the desired borehole inclination or target area, the continuous comparison of measured and preprogrammed formation characteristics, and the adjustment (either automatically or by commands from the surface) of the drilling direction based upon these comparisons. The formation evaluation features of this and other references directed toward "geosteering" are rather fundamental in that they are designed to identify the formation that is being penetrated (e.g. sand or shale) for steering purposes rather than to perform a detailed analysis of the formation.

SUMMARY OF THE INVENTION

The current invention is directed toward the use of a downhole computer within a measurement-while-drilling (MWD) device to process data from the response of a plurality of sensors of different types. The basic concepts of the invention are also applicable to wireline operations, particularly where the number of sensors and the raw data output of these sensors exceed available wireline telemetry capacity. Types of sensors applicable to the invention include, but are not limited to, electromagnetic, acoustic, nuclear, directional, temperature and pressure. Sensor measurements are made essentially simultaneously with each sensor, and the sensor responses are processed using the computational means within a downhole subassembly to obtain measures of formation and other properties and functions of interest. These computed parameters or "answers" are then transmitted to the surface by a suitable MWD telemetry system such as a mud-pulsed system. In an alternate embodiment, the answers are stored in a first downhole storage means of the MWD system for subsequent retrieval when the drill string is removed or "tripped" from the borehole. In still another embodiment, the answers are both telemetered to the surface and simultaneously stored within the first downhole storage means.

The current invention is further directed toward the downhole combination of reference data, stored within a second downhole storage means, with measured sensor data using downhole computing means to determine additional parameters of interest. This embodiment of the invention is used (a) to improve measurements of formation characteristics, locations of the sensors within the formations, directional and drilling dynamics parameters of interest while drilling, (b) to provide real time correlation between these MWD parameters of interest and reference data such as offset wireline logs, drilling objective data, and seismic data and (c) to store and compare parameters made during subsequent passes of formations within a given borehole where such comparisons are indicative of permeability and other properties. Some features of this embodiment of the invention are applicable to wireline logging operations. In general, aspects of this embodiment are again applicable to any wireline system in which telemetry capacity is small with respect to the volume of measured raw data. In particular, the invention is applicable to wireline systems utilizing a single conductor logging cable for logging high pressure wells.

Preferably, the system includes a downhole subassembly comprising a computer, one or more sensors, and telemetry means to transmit parameters of interest to the surface. For purposes of definition, the term "sensor" includes both the transmitter and receiver components of acoustic and electromagnetic sensors and the source and detector components of induced nuclear sensors. The subassembly further comprises memory means, preferably a first and a second memory means, which may be a partitioned memory which is an integral part of the computer or, alternatively, separate downhole memory modules cooperating with the computer. In addition, the downhole subassembly comprises power sources and control circuitry to operate the computer, sensors, telemetry and memory means. The downhole subassembly is preferably located in close proximity to the drill bit and is preferably an integral part of a drill collar.

The downhole computer is programmed to process measured data from the multiple sensors of different types using a predetermined sensor response relationship. The sensor response relationship for any particular combination of sensors is preferably formulated as a response matrix. During actual drilling operations, raw data are recorded by one or more sensors during a sample time period. These data are next correlated to a common measure point and then preferably arranged into a data matrix by the downhole computer and stored temporarily within the computer along with the depth of the common measure point at which the measurements were made. The parameters of interest are then determined from the product of the response matrix and the data matrix, with the matrix multiplication being performed within the downhole computer. Raw sensor data from all sensors are processed in parallel rather than serially processing the response of each sensor. The computed parameters of interest and corresponding depth are then telemetered to the surface, using a system such as a mud-pulse telemetry system, and recorded at the surface as a function of depth at which they were determined. Alternatively, the parameters of interest can be stored in a first downhole memory for subsequent retrieval at the surface, or simultaneously telemetered to the surface and stored for subsequent retrieval. Methods other than the previously described matrix manipulation method can be used to combine raw sensor data to obtain the parameters of interest.

An advantage of the invention, as disclosed to this point, over prior art MWD systems is that a plurality of data-intensive formation sensors can be employed. Copious amounts of raw data are processed downhole resulting in a substantially reduced amount of data in the form of parameters of interest or "answers" which does not exceed current MWD telemetry and storage capacity. A further advantage of the invention is that parallel processing means can be employed using the downhole computer or computers thereby increasing the accuracy and precision of the parameters of interest. A still further advantage of the invention is that the effective use of available telemetry and storage capacity by means of downhole computations leaves telemetry and storage capacity available for additional, non-formation evaluation type parameters such as drilling dynamics data and the operational status of the downhole measuring systems. Other advantages will become apparent in subsequent sections of this disclosure.

An alternative embodiment of the invention includes real-time correlation of previously discussed parameters of interest measured within a given "drilling" well with "external" geological or geophysical type reference data. This type of reference data may comprise offset wireline or MWD logs, drilling target parameters or seismic data. Many data processing methods can benefit from apriori knowledge of expected, measured or calculated values and their correlation. For example, covariance matrices computed from other wells and methods which utilize real-time data, statistics on prior data and downhole subassembly characteristics. These reference data are stored in a second downhole storage memory which may be a separate module or may be a partitioned part of integral downhole computer storage made available by the use of previously discussed downhole processing means to reduce voluminous raw sensor data to parameters of interest. By correlating, in real-time, drilling well parameters of interest with external reference data, unexpected anomalies encountered in drilling such as faults can be detected in real time. Such correlations can greatly improve the overall drilling management program and in particular aid the driller in reaching the targeted zone in the most efficient manner. The methods and apparatus for obtaining these advantages, along with specific examples, will be detailed in subsequent sections of this disclosure.

Reference data may comprise parameters of interest made in the drilling well during earlier passes of the downhole subassembly. If the measured parameters of interest are affected at least in part by the near borehole zone which is "invaded" by the drilling fluid, sequential "time-lapse" measurements within the drilling well yield information on the rate of invasion of the drilling fluid which, in turn, can be related to the permeability and/or producibility of the formation. It is not feasible to make such measurements using wireline technology because of operational, technical and costs constraints.

Reference data may also comprise additional response matrices or other means for transforming raw sensor data into parameters of interest. Commands from the surface can vary data conversion means based upon drilling conditions or other factors thereby improving determinations of the parameters of interest. A two-way MWD telemetry system suitable for transferring downlink commands is required.

The two-way communication system can use the drill pipe as a communication path for acoustic waves of different carrier frequencies between the downhole and uphole terminals of the communication system. The preferred two-way communication system employs the drilling mud column as a communication path. Pressure pulses at different carrier frequencies are induced by the downlink and uplink transmitter elements of the communication system. Uplink and downlink data modulate the respective carrier frequencies thereby allowing data to be transmitted uphole and downhole over the common mud column communication path.

An advantage over prior art of this invention is that parameters of interest are correlated downhole with reference data is that unexpected geological anomalies can be detected in real time. An additional advantage is that seismic data can be tied in with logging data during the drilling of a well. A further advantage is that extended drilling within a given well can be obtained to a high degree of accuracy by making multiple passes along the borehole with the downhole subassembly. A still further advantage is that drilling dynamics measurements from prior passes of the downhole subassembly along the borehole can be used as reference data to optimize the drilling program to extend the well to total depth. An additional advantage is that indications that the target formation has been reached can be obtained in real-time. A still further advantage is that accuracy and precision of computed parameters of interest can be optimized by storing additional sensor response matrices as reference data. A further advantage is that relatively deep penetrating sensors can be used to obtain information about subsurface formations lying ahead of the drill bit. These advantages will be expanded upon in subsequent sections of this disclosure.

Examples of the more important features of the invention have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals, wherein:

FIGS. 1c–1c4 shows a schematic diagram of an embodiment of certain deflection devices placed in relation to each other in a downhole assembly;

DETAILED DESCRIPTION OF THE PREFERRED EMBODIMENTS

Typical MWD Embodiments of the Invention

Figures 1A, 1D:
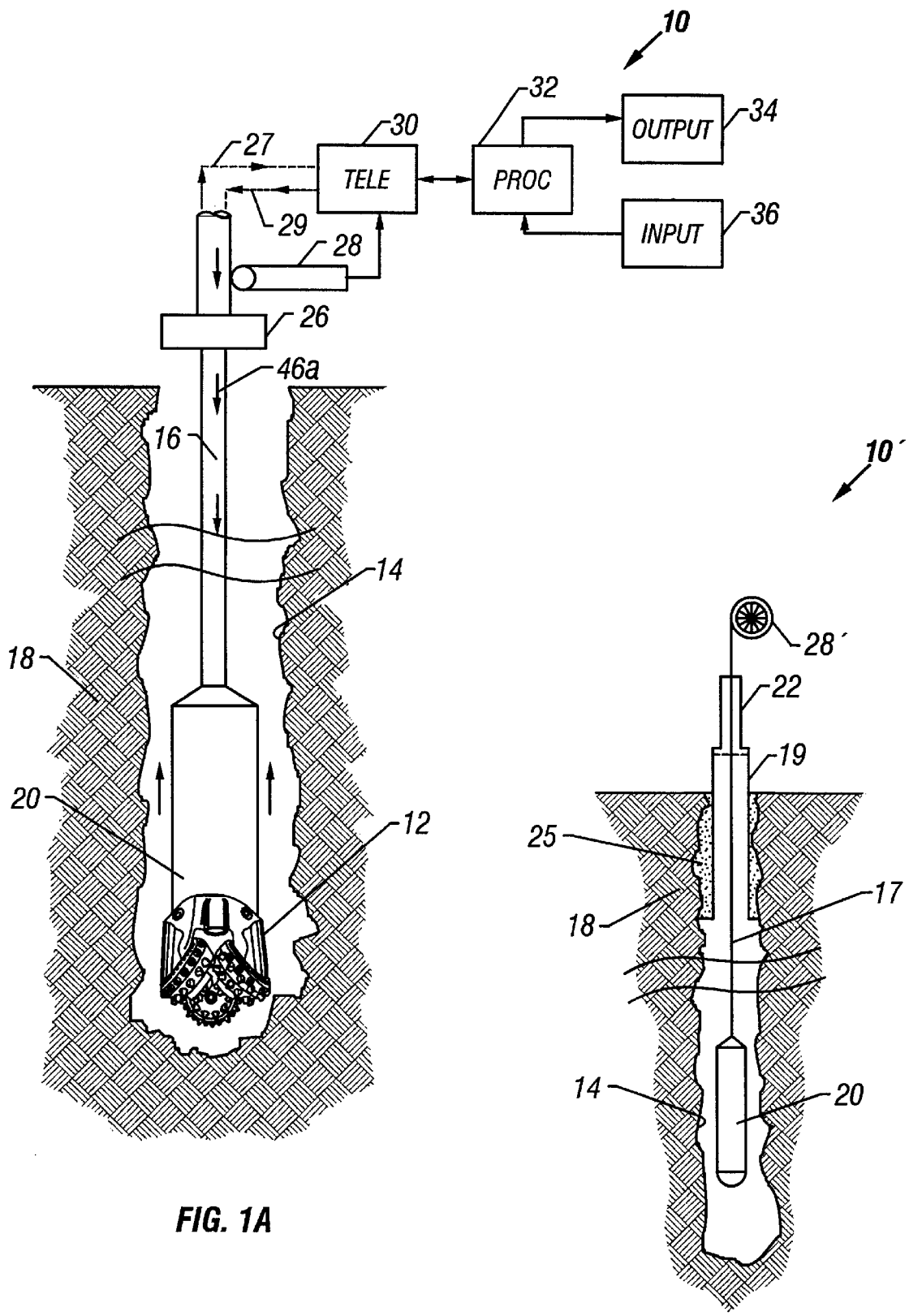
FIG. 1a shows a schematic diagram of a drilling system which employs the apparatus of the current invention in an measurement-while-drilling embodiment.
FIG. 1d shows the present invention in a wireline logging embodiment.

FIG. 1a shows a schematic diagram of a measurement-while-drilling (MWD) embodiment of the system 10 of the present invention. It includes a downhole subassembly 20 that is suspended within the borehole 14 by a drill string 16 during drilling of the borehole 14. The downhole subassembly 20 is positioned as close as practical to the drill bit 12. The drill bit 12 is rotated by a downhole motor contained in the downhole subassembly and/or by rotating the drill string by a surface prime mover to drill the borehole 14 in the earth formation 18. For simplicity, the prime mover and other components of the surface drilling rig are not shown. A preferred embodiment of the downhole assembly 20 comprising various sensors and devices will be described later with reference to FIGS. 1b and 1c.

Data from the downhole subassembly 20 are telemetered by a downhole telemetry system (not shown) in the downhole subassembly 20 to an uphole telemetry element 30. The uplink data telemetry path is indicated by the broken line 27. Data from the downhole subassembly 20 are received by the uphole telemetry element 30 and passed to a surface processor 32. A processor 32 controls the output 34 such that the parameters of interest are recorded and displayed in the desired manner which is usually a plot of the parameters of interest as a function of depth within the borehole at which they are determined. The telemetry system utilized in the present invention preferably is a two-way telemetry system as disclosed in the U.S. patent application Ser. No. 08/371,882, assigned to the assignee of this application, which is fully incorporated herein by reference.

The processor 32 also receives input data from the input element 36 which are telemetered downhole by a downlink telemetry path denoted by the broken line 29 to the downhole subassembly 20. The use of a two-way communication system is especially useful in changing reference data such as offset well data or even sensor response model data during the actual drilling operation. The system 10 also includes a surface depth measurement system, such as a depth measure wheel and associated circuitry 28. A depth measurement system (not shown) also is included in the downhole subassembly 20 which enable a downhole computer to more accurately correlate or compute various sensor measurements and parameters of interest to their respective depths or true locations within the borehole 14 at which such measurements are made.

Figure 1B:
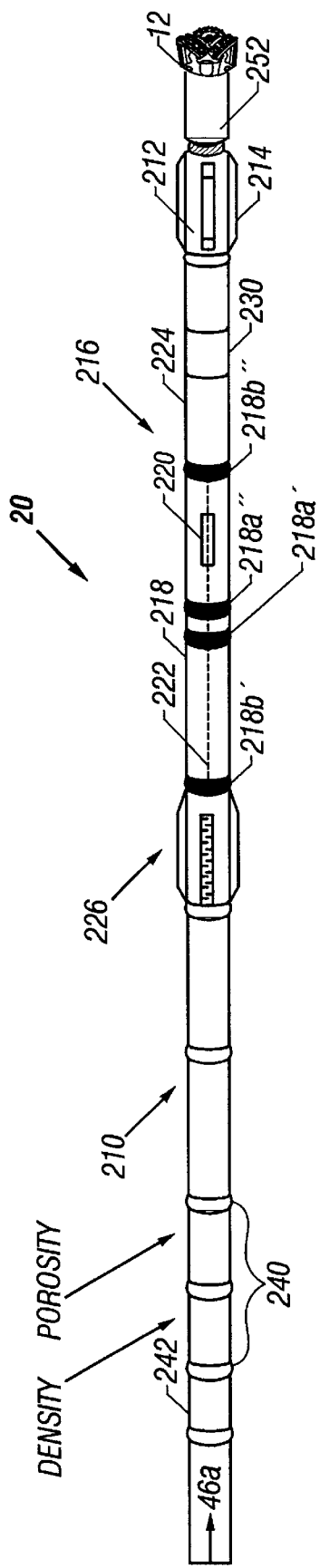
FIG. 1b shows a schematic diagram of a drill string containing a drill bit, mud motor, depth measurement device, deflection devices, sensors for measuring formation properties and borehole conditions, and downhole telemetry, according to one embodiment of the present invention.

FIG. 1b shows a preferred arrangement of the various devices and sensors contained in the downhole assembly 20, which is coupled between the drill bit 12 and the drill pipe 16. The downhole assembly 20 preferably contains a drill motor or mud motor 210 that is operatively coupled to the drill bit 12 via a drive shaft (not shown) disposed in a bearing assembly 212 which rotates the drill bit 12 when a pressurized drilling fluid 46a is passed through the mud motor 210. The bearing assembly 212 supports the radial and axial forces of the drill bit 12, the downthrust of the drill motor 210 and the reactive upward loading from the applied weight on bit. A lower stabilizer 214, preferably placed over the bearing assembly 212, acts as a centralizer for the lowermost portion of the mud-motor assembly. In applications requiring drilling only vertical boreholes, usually no drill motor is used and the drill bit is rotated by rotating the drill pipe by a prime mover at the earth's surface.

The downhole assembly 20 preferably contains a plurality of sensors for providing measurements for various formation parameters and downhole conditions, a depth measuring device, and downhole geosteering devices that enable altering drilling direction without requiring retrieval of the drill string. The embodiment of FIG. 1b shows a kick-off assembly 224 and an upper stabilizer 226 placed between the drill motor 210 and the bearing assembly 212. The function and operation of the stabilizers and the kick-off assembly in the context of this invention will be described later with reference to FIG. 1c. The downhole assembly preferably has a module, generally referred by the numeral 216, placed above the kick-off subassembly 224 and the upper stabilizer 226. This module 216 includes a resistivity device 218 for determining the formation resistivity near and/or in front of the drill bit 12, a gamma ray device 220 for measuring the formation gamma ray intensity and an inclinometer 222 for measuring inclination of the module 216.

The resistivity measuring device 218 preferably is of the type described in the U.S. Pat. No. 5,001,675, which is assigned to the assignee hereof and is incorporated herein by reference. This patent describes a propagation resistivity device having one or more pairs of transmitting antennas 218a' and 218a" spaced from one or more pairs of receiving antennas 218b' and 218b". Magnetic dipoles are employed which operate in the medium frequency and lower high frequency spectrum. In operation, the transmitted electromagnetic waves are perturbed as they propagate through the formation surrounding the resistivity device 218. The receiving antennas 218b' and 218b" detect the perturbed electromagnetic waves. Formation resistivity is derived from the phase and amplitude of the detected signals. The detected signals are processed by a downhole circuit contained within the downhole assembly 20. The gamma ray device 220 and the inclinometer 222 are suitably placed along the resistivity measuring device 218 in the module 216. However, the inclinometer and gamma ray device may be placed at any other suitable place in the downhole assembly.

The downhole assembly 20 preferably contains an inertial guidance device, such as a gyroscopic device 230, for determining the position of a known point in the downhole subassembly 20 during the drilling of the borehole 14. Any other suitable depth measuring device, such as a magnetometer, may be deployed in the downhole subassembly for the purpose of this invention. In addition, a formation porosity measuring device and a formation density measuring device, collectively denoted herein by the numeral 240, are provided above the drill motor 210.

The present system preferably utilizes a formation porosity measurement device, such as that disclosed in the U.S. Pat. No. 5,144,126 which is assigned to the assignee hereof and which is incorporated herein by reference. This device employs a neutron emission source and a detector for measuring the resulting scattered neutrons. In use, fast neutrons are emitted into the surrounding formation. A suitable detector measures the neutron energy delay due to interaction with hydrogen atoms present in the formation. The device measures the neutron porosity ($\emptyset_n$) of the formation. Other examples of nuclear logging devices are disclosed in U.S. Pat. Nos. 5,126,564 and 5,083,124.

The formation density device preferably is the nuclear density device disclosed in the U.S. Pat. No. 5,134,285, which is assigned to the assignee hereof and which is incorporated herein by reference. Such a device employs a gamma ray source and a detector. In use, gamma rays emitted from the source enter the formation where they interact with the formation and attenuate. The attenuation of the gamma rays is measured by a suitable detector from which density of the formation is determined.

In addition to the sensors described above, the system 10 of the present invention contains a number of other sensors, such as sensors for determining downhole temperatures, pressure, drill bit rotational speed, fluid flow rate through the mud motor, etc.

The downhole assembly 20 also contains devices which may be activated downhole as a function of the downhole computed parameters of interest alone or in combination with surface transmitted signals to adjust the drilling direction without retrieving the drill string from the borehole, as is commonly done in the prior art. This is achieved in the present invention by utilizing downhole adjustable devices, such as the stabilizers and kick-off assembly. One arrangement of such devices is shown in FIG. 1c.

Referring to FIG. 1c, the deflection device 250 contains an adjustable bit subassembly 252 that is coupled directly to the drill bit 12. The drill bit subassembly 252 has an associated control means which upon receiving appropriate command signals causes the drill bit 12 to turn from a current position 252' to a desired position 252"as shown in the exploded view of FIG. 1c1. Such a device allows changing the drill bit direction relative to a fixed tool. Typically, the drill bit subassembly 250 can effect relatively smaller changes in the drilling course.

To effect greater drill bit directional changes or steering while drilling, the downhole assembly is provided with downhole adjustable lower and upper stabilizers 214 and 226 and an adjustable kick-off subassembly 224. The lower and upper stabilizers 214 and 226 preferably have a plurality of associated independently adjustable pads 214a and 226a as shown in the exploded FIGS. 1c2 and 1c3. Each adjustable pad is adapted to be radially extended and contracted to any desired position by means within the downhole subassembly 20, such as hydraulic means and/or electromechanical means, such as an electric motor. Alternatively, the stabilizer pads may be made to move in unison and extended or contracted to desired positions. The kick-off subassembly 224 is designed so that it may be turned at a deflection point 224a to a desired angle, as shown by the dotted lines 224a' in the exploded view of FIG. 1c4. The adjustable pads 214a and 226a and the kick-off subassembly 224 are controlled by their respective means which are responsive to selected downhole signals executed by a downhole computer and/or signals transmitted from a surface device. The lower adjustable pads 214, upper adjustable pads 226 and kick-off subassembly 224 define a three point geometry, which enables steering the drill bit in any desired direction.

In the above-described preferred embodiment, the mud motor 210 transfers power to the drill bit 12 via one or more hollow shafts that run through the module 216. The hollow shaft enables the drilling fluid to pass from the mud motor 210 to the drill bit 12. In an alternative embodiment of the downhole subassembly 20, the mud motor 210 may be coupled below the resistivity measuring device 218 or at any other suitable place. The system of the present invention also includes a suitable means, such as a bypass valve (not shown), which may be activated by the downhole computer during the drilling operation to control the fluid flow through the mud motor and, thus, control the rotational speed of the mud motor and hence the drill bit 12.

The various components of the downhole assembly 20 are preferably interconnected modules, each such module containing various sensors and devices. Each module is contained in a fluid tight housing which shields the internal elements thereof from the borehole environment. A modular construction is described in the U.S. patent application Ser. No. 08/212,230, assigned to the assignee hereof, which is incorporated herein by reference.

FIG. 1d the system of the present invention in a wireline embodiment, generally designated by numeral 10'. The downhole subassembly 20 is suspended within borehole 14 by the wireline 17. Casing 19 is positioned in the upper portion of the borehole 14. The annulus between the casing 19 and the borehole 14 is filled with cement which provides a hydraulic and pressure seal. A lubricator 22 is affixed to the top of the casing 17 thereby providing a conduit through which the wireline 19 passes and also providing a means of containing any pressure within the borehole 14. The wireline 17 passes over a calibrated depth measure wheel 28' and is attached to a draw works (not shown). The depth measure wheel 28' performs the same functions as the depth measure wheel 28 described previously in the MWD embodiment of the invention. The draw works cooperates with the wireline to convey the downhole subassembly 20 along the borehole 14 in a manner well known in the art. As mentioned previously, the wireline also provides a communication path between the downhole subassembly 20 and the surface telemetry unit 30.

Figure 2A:
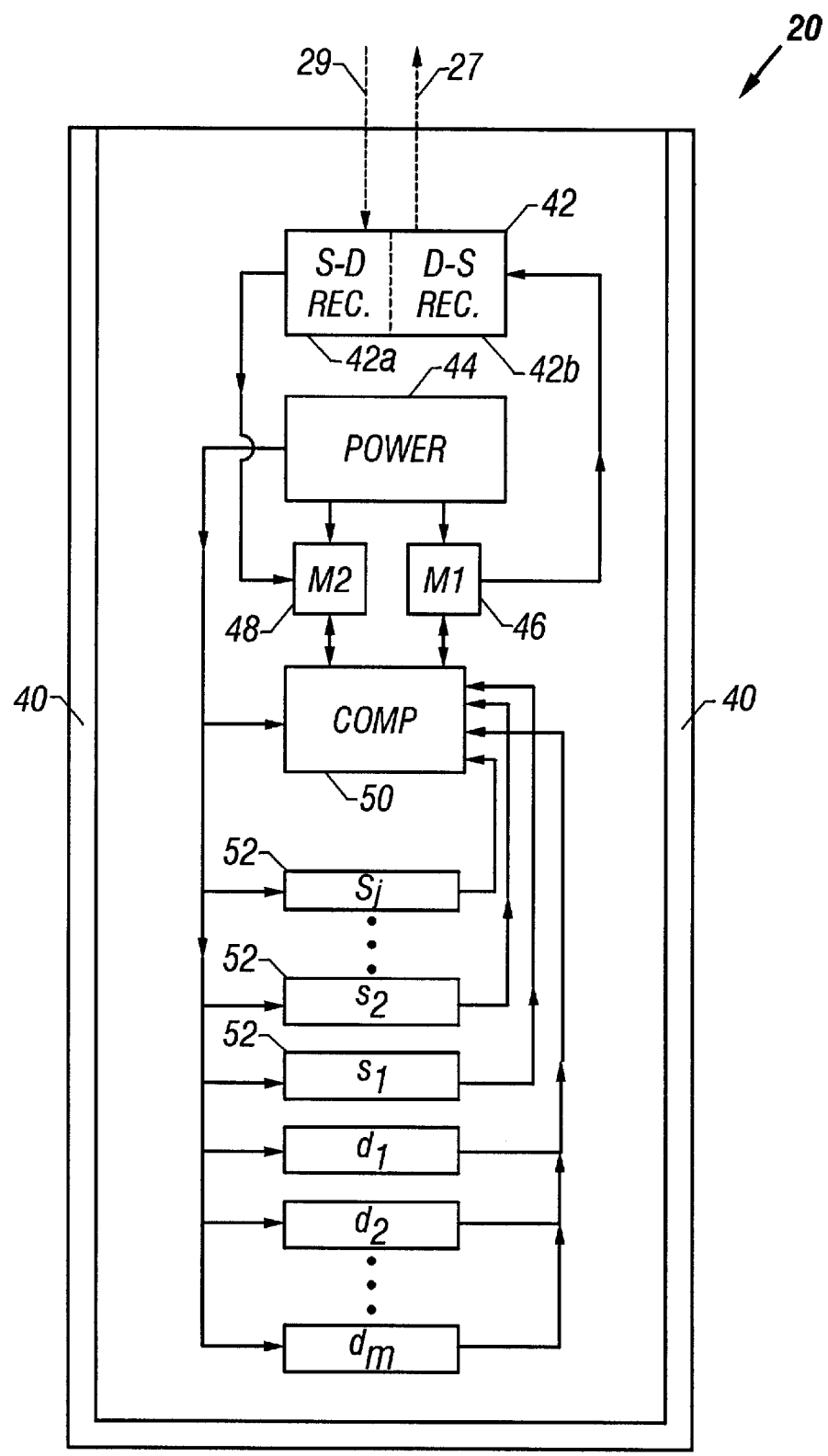
FIG. 2a shows a functional block diagram of the major downhole elements of the system of the present invention.
Figure 3A:
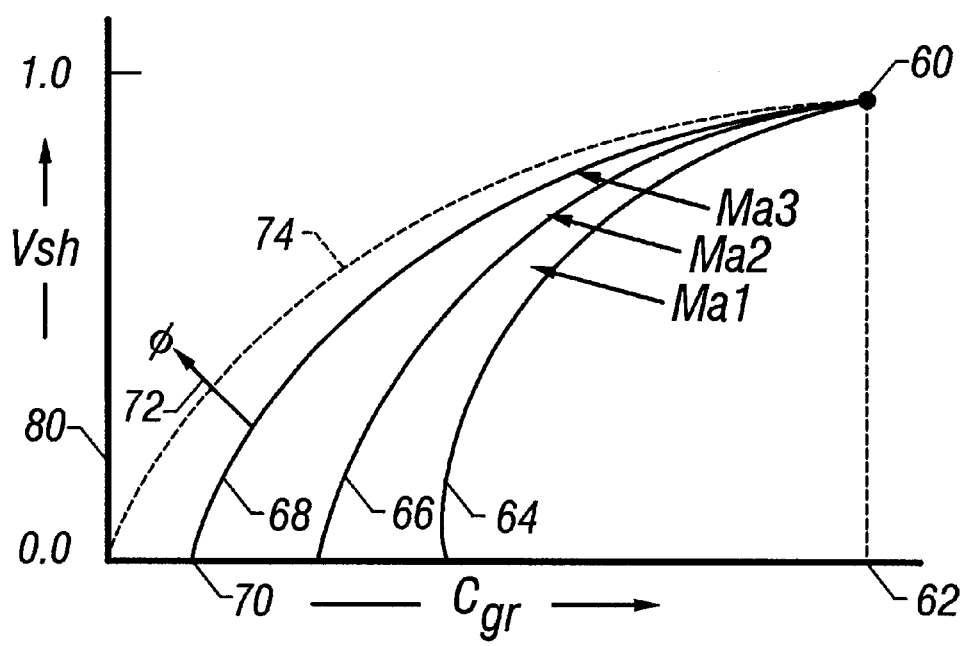
FIGS. 3a and 3b illustrate graphically the response of two sensors and the functional dependence of these responses upon downhole parameters.

FIG. 2a shows a functional block diagram of the major elements of the downhole assembly 20 and further illustrates with arrows the paths of cooperation between such elements. It should be understood that FIG. 2a illustrates only one arrangement of the elements and one system for cooperation between such elements. Other equally effective arrangements may be utilized to practice the invention. A predetermined number of discrete data point outputs from the sensors 52 are stored within a buffer which, in FIG. 2a, is included as a partitioned portion of the memory capacity of a computer 50. The computer 50 preferably comprises commercially available solid state devices which are applicable to the borehole environment. Alternatively, the buffer storage means can comprise a separate memory element (not shown). The sensor response relationships or "emodels" are stored within memory 48 which preferably comprises commercially available solid state storage devices suitable for the borehole environment. In addition, other reference data such as seismic data, offset well log data statistics computed therefrom, and predetermined drilling path also are stored in the memory 48. A two way communication link exists between the memory 48 and the computer 50. The responses from sensors 52 are transmitted to the computer 50 wherein they are transformed into parameters of interest using methods which will be detailed in a subsequent section hereof.

The computer 50 also is operatively coupled to certain downhole controllable devices d1–dm, such as adjustable stabilizers and kick-off subassembly for geosteering and to a flow control device for controlling the fluid flow through the drill motor for controlling the drill bit rotational speed.

The sensors 52 are usually axially spaced within the downhole subassembly 20 and operate simultaneously. The sensors 52, therefore, do not provide measurement corresponding to the same borehole location at the same time. Therefore, before combining the sensor data, the computer 50 shifts the raw sensor data to a common reference point, i.e. depth correlates such data, preferably by utilizing depth measurements made by the downhole depth measurement device contained in the downhole subassembly 20. Also, different sensors 52 usually do not exhibit the same vertical resolution. The computer, therefore, is programmed to perform vertical resolution matching before combining the sensor data. Any suitable method known in the art can be used to depth shift and resolution match the raw sensor data. Once computed from the depth shifted and resolution matched raw data, the parameters of interest are then passed to the down hole portion of the telemetry system 42 and subsequently telemetered to the surface by a suitable uplink telemetry means illustrated conceptually by the broken line 27. The power sources 44 supply power to the telemetry element 42, the computer 50, the memory modules 46 and 48 and associated control circuits (not shown), and the sensors 52 and associated control circuits (not shown). Information from the surface is transmitted over the downlink telemetry path illustrated conceptually by the broken line 29 to the downhole receiving element of downhole telemetry unit 42, and then transmitted to the storage means 48. In the MWD embodiment, the telemetry transmission path between the downhole telemetry unit 42 and the uphole telemetry unit 30 is the drilling mud column in the preferred embodiment.

Figure 2B:
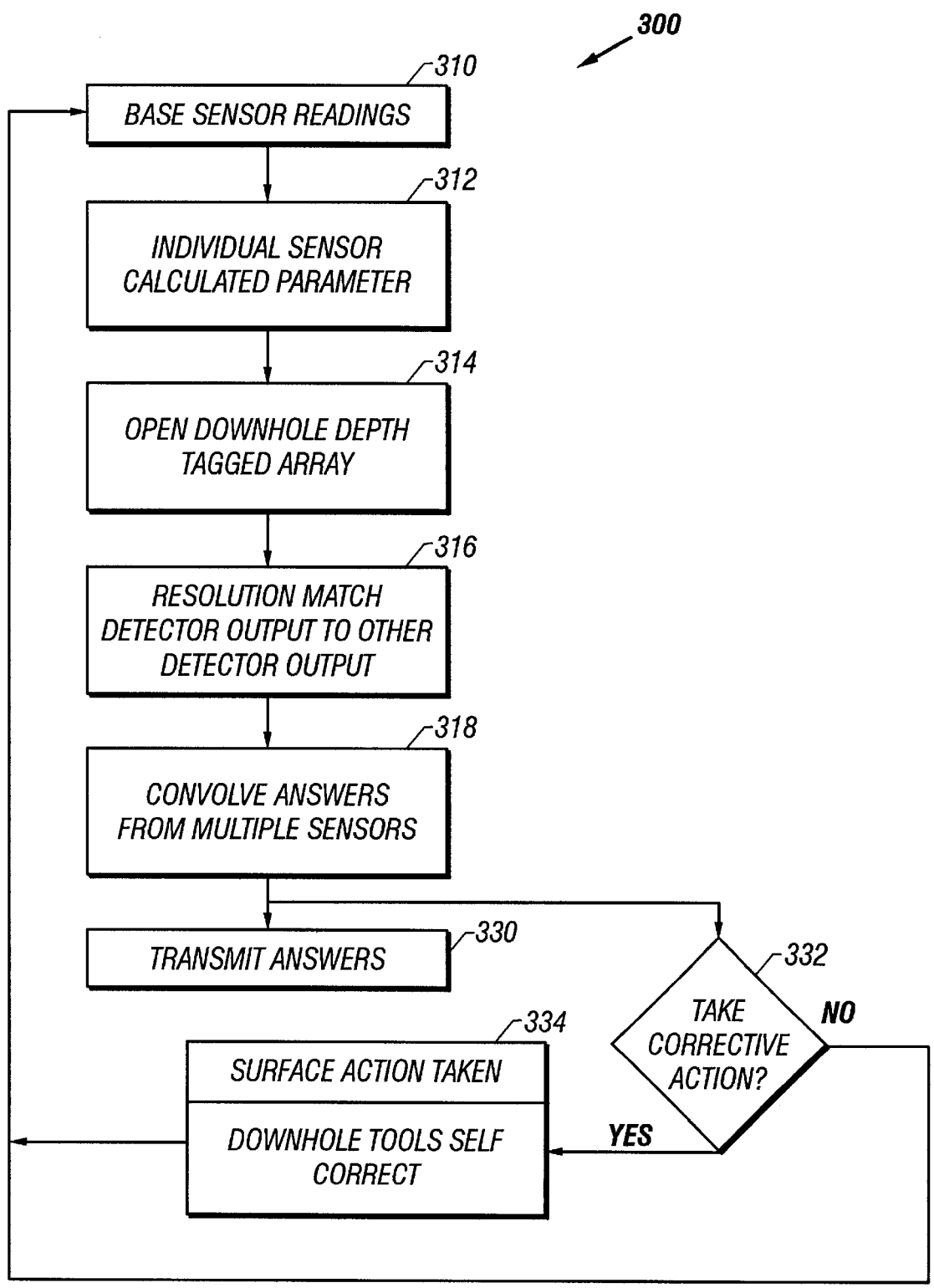
FIG. 2b shows a generalized flow diagram for determining parameters of interest by utilizing a downhole computer.

FIG. 2b shows a generalized flow chart of determining parameters of interest downhole and the utilization of such parameters in the context of this invention. The individual sensors, such as the porosity, density, resistivity and gamma ray devices obtain base sensor measurement and calculate their respective parameters. For example the neutron porosity device may provide the value of the formation nuclear porosity ($\emptyset_n$) and the density device may provide the formation density. Such sensor measurements are retrieved by the computer according to programmed instruction for determining the parameters of interest. The computer receives depth measurements from the downhole depth device 230 (FIG. 1b) and/or from the surface processor 32 (FIG. 1a) and correlates the sensor measurements to their respective true borehole depth as shown by the box 314. The downhole computer then matches the resolution of the depth correlated measurements. For example, neutron porosity on a sandstone matrix at a given depth resolution is matched to other sensor measurements in the downhole assembly.

The computer then transforms or convolves a selected number of measurements to determine desired parameters of interest or answers as shown by the block 318. The parameters of interest may include parameters such as the water saturation ($S_w$), true formation porosity obtained from the neutron porosity $\emptyset_n$ and the formation density from the density device, flushed zone saturation, volume of shale in the formation ($V_{sh}$), recovery factor index ("RFI"), amount of the drill string direction deviation from a desired borehole path, etc. The computer also may be adapted to compare the borehole formation logs with prior well logs and seismic data stored in downhole memory and to cause the deflection elements (see FIG. 1b) to adjust the drilling direction. The computer 50 transmits selected answers to the surface 330 and takes certain corrective actions 332, such as correcting the drilling direction and adjusting the drill bit rotational speed by adjusting the fluid flow through the drill motor. The surface processor 32 receives the data from the downhole computer via the downhole telemetry and may send signals downhole to alter the downhole stored models and information, causing the downhole computer to take certain actions as generally shown by block 334. In one embodiment, the system described here is a closed loop system, in that the answers computed downhole may be adapted to cooperate with surface signals and may be utilized alone or in conjunction with external information to take certain action downhole during the drilling operations. The computed answers and other information is preferably stored downhole for later retrieval and further processing.

For clarity and ease of understanding, the determination of parameters of interest downhole from the various downhole assembly sensors will now be described by way of a examples. It will, however, be understood that the present invention is not limited to such specific examples.

Data Acquisition and Processing

For ease of understanding, an overview of the general data acquisition and processing methodology used in this invention is described first followed by details of the methodology.

The downhole computer 50 is programmed to process measured data from the multiple sensors of different types using predetermined sensor response relationships. As an example, assume that the downhole subassembly contains sensors for detecting scattered gamma radiation spectra, thermal neutron flux, attenuation and phase shift of electromagnetic radiation, acoustic travel time, and an inclinometer and a three axis accelerometer. The response characteristics for any particular combination of sensors is preferably formulated in the form of a response matrix. The response matrix is generated for any particular combination of sensors either with measurements within environmental test formations of known borehole and formation characteristics, or mathematical modeling of the tool sensor responses under known conditions, or both. The response matrix is programmed within the downhole computer. The response matrix may change as borehole conditions change. The current invention provides means for changing the response matrix while drilling as will be disclosed in a following section. During actual drilling operations, raw data are recorded by one or more sensors during a sample time period. These data are next correlated to a common measure point and then arranged into a data matrix by the downhole computer and stored temporarily within the computer along with the depth of the common measure point at which the sensor measurements were made. The parameters of interest are then determined from the product of the response matrix and the data matrix, with the matrix multiplication being performed within the downhole computer.

For purposes of illustration, further assume that the response matrix contains m rows and n columns and that the data matrix is one dimensional containing "m" rows. The parameter matrix would be a one dimensional matrix containing "n" rows. Each element of the parameter matrix represents a computed parameter of interest. The computed parameters of interest and corresponding depth are then telemetered to the surface using a system such as a mud-pulse telemetry system and recorded at the surface as a function of depth within the borehole, or alternatively stored in a first downhole memory for subsequent retrieval at the surface, or simultaneously transmitted to the surface and stored in the first downhole memory means. Using the sensor array defined above, the elements of the parameter matrix might represent the resistivity, dielectric constant, bulk density, effective porosity and hydrocarbon saturation of the formation, the diameter of the borehole and the azimuth and inclination of the downhole subassembly.

It should be understood that m, the number of measured raw data points, is equal to or greater than n, the number of parameters of interest. In the examples of multiple phase and attenuation measurements, multiple gamma ray and neutron spectral measurements, and full wave acoustic measurements, the number m is orders of magnitude greater than n. It should also be understood that a plurality of raw data measurements can be obtained from a single sensor such as a single electromagnetic transmitter-receiver array with the transmitter operating at a plurality of frequencies. Using current MWD telemetry and storage capacities, only the n parameters of interest can be effectively telemetered or stored thereby requiring that each parameter of interest be computed downhole at each depth interval. Bandwidth and storage limitations prevent telemetering and storage, respectively, of the raw data measurements m.

Methods other than the previously described matrix manipulation method may also be used to combine raw sensor data with operational characteristics of the sensors to obtain parameters of interest. Parallel processing computing means are ideally suited for processing or "reducing" large amounts of measured data to relatively small amounts of processed or "answer" data. Emerging neural network technology is likewise suited for performing the stated tasks in a most efficient manner.

The processing of raw downhole sensor data will be illustrated using a relatively small number of downhole sensors 52. Assume that the downhole subassembly 20 comprises:

(1) a natural gamma ray sensor which measures the total or gross natural gamma radiation emitted by the formation;

(2) a spectral gamma ray sensor which measures natural gamma radiation emitted by the formation falling within a plurality "w" of energy ranges or energy "windows";

(3) a chemical source of neutrons such as Americium-beryllium (AmBe) with a thermal neutron detector axially spaced a relatively short distance from the source of neutrons;

(4) the same type source of neutrons with a thermal neutron detector axially spaced a relatively long distance from the source of neutrons;

(5) an isotopic source of gamma radiation such as cesium-137 ($^{137}$Cs) with a gamma ray detector axially spaced a relatively short distance from the source of gamma radiation with which scattered gamma radiation from the isotopic source is measured;

(6) the same type isotopic source of gamma radiation with a gamma ray detector axially spaced a relatively long distance from the source of neutrons with which scattered gamma radiation from the isotopic source is measured; and (7) an acoustic sensor for measuring the distance or "stand-off" between the wall of the downhole subassembly 20 and the wall of the borehole 14.

The gross gamma ray activity of the formation is used as an indicator of the amount of shale within the formation and the spectral natural gamma ray detector is used to classify types of shale and to aid in the identification of other constituents of the formation. The neutron source and short-spaced and long-spaced thermal neutron detectors are used as an indicator of formation porosity. Likewise, the gamma ray source and long and short spaced gamma ray detectors are used to measure the bulk density of the formation which measurements, in turn, is used to make a second determination of porosity. Finally, stand-off of the downhole subassembly is determined using the acoustic stand-off sensor. These stand-off measurements are then used to correct the porosity and bulk density measurements for the adverse effects of stand-off.

Individual Sensor Responses

The responses of each of the above sensors are, however, not a sole function of the parameter of interest being calculated from the response. As probably the most simple example of this phenomena, the response of the gross natural gamma ray sensor is not only a function of the shale content of the formation but also a function of the other constituents of the formation which emit gamma radiation and, to a lesser extent, a function of the porosity of the formation.

Details of the data processing methods will now be presented using the following terminology:

$\varnothing_e$=the effective porosity of the formation;
$V_{sh}$=the shale fraction of the formation;
$f_q$=the fractional mineralogical constituents of the formation where q=1, 2, ..., p; and $$\varnothing_e + V_{sh} + f_1 + f_2 + \ldots f_p = 1.0.$$

The responses of the various sensors used in the example are:

$C_{gr}$=the count rate measured by the gross natural gamma ray detector;

$C_{sgr,v}$=the count rate measures by the spectral natural gamma ray detector in window v=1,2, ..., w;

$C_{n,ss}$=the count rate measured in the short spaced thermal neutron detector;

$C_{n,ls}$=the count rate measured in the long spaced thermal neutron detector;

$C_{sgr,ss}$=the count rate measured in the short spaced scattered gamma ray detector;

$C_{sgr,ls}$=the count rate measured in the long spaced scattered gamma ray detector; and $T_h$=the series of acoustic travel times used to compute downhole subassembly stand-off.

Subassembly stand-off is preferably measured by (a) employing a transducer to transmit a train of acoustic pulses azimuthally around the borehole and (b) measuring the travel time of each pulse as it reflects from the borehole wall and returns to the transducer.

As stated previously, the response of the gross natural gamma ray sensor is not only a function of $V_{sh}$ but also a function of $\varnothing_e$ and the natural gamma ray activity of the rock matrix constituents $f_q$. For brevity, the constituents $f_q$ will be referred to as a group representing the rock matrix using the symbol "Ma". Stated mathematically, $C_{gr}(V_{sh}, \varnothing_e, Ma) = F(V_{sh}, \varnothing_e, M_a)$ where $F(V_{sh}, \varnothing_e, Ma)$ is a functional relationship illustrated hypothetically in FIG. 3a. The shale fraction $V_{sh}$ is plotted on the ordinate 80 as a function of measured count rate $C_{gr}$ which is plotted on the abscissa 70. This functional relationship is presented for three different rock matrices $Ma_1$, $Ma_2$ and $Ma_3$ represented by the curves 64, 66 and 68, respectively. The three curves are for formations with $\emptyset_e=0$ and are also for a specific type of shale with a given gamma ray activity per unit volume. All curves converge at point 60 at $V_{sh}=1.0$ (100% shale formation) with a corresponding count rate identified by the numeral 62. For a different type of shale, the point of convergence for $V_{sh}=1.0$ might yield a count rate shale which is greater or less than the count rate identified by the numeral 62. As the porosity of the formation increases, the functional relationship between $V_{sh}$ and $C_{gr}$ changes. Using the matrix $Ma_3$ as an example, the curve will be displaced to the left with increasing $\emptyset_e$ as depicted by the broken line curve 74. This, of course, assumes that the pore space of the formation is filled with fluid which is lower in gamma ray activity per unit volume than the rock matrix $Ma_3$. Based upon the hypothetical example shown in FIG. 3a, the functional response "model" for the gross natural gamma ray sensor can be written as $$C_{gr}(V_{sh}, \emptyset_e, M_a) = F(V_{sh}, \emptyset_e, M_a) \qquad (1)$$
$$= K_{gr}[(a_1 V_{sh} + b_1 V_s h^2) + c_1 M_a (1.0 - \emptyset_e - V_{sh})]$$

where $K_{gr}$ is a constant depending upon the size and efficiency of the gamma ray detector, $a_1$, $b_1$, and $c_1$ are constants, and Ma is the gamma count rate emitted per unit volume of the rock matrix. The terms $K_{gr}$, $a_1$, $b_1$, and $c_1$ are "known" calibration constants which are either determined by operating the sensor in known test formations or are calculated using mathematical models of the sensors. The terms $\emptyset_e$, $V_{sh}$ and $M_a$ (or more specifically the major constituents $f_q$ of the rock matrix $M_a$) are the "unknown" parameters of interest to be determined. $C_{gr}$ is, of course, a "measured" quantity.

Figure 3B:
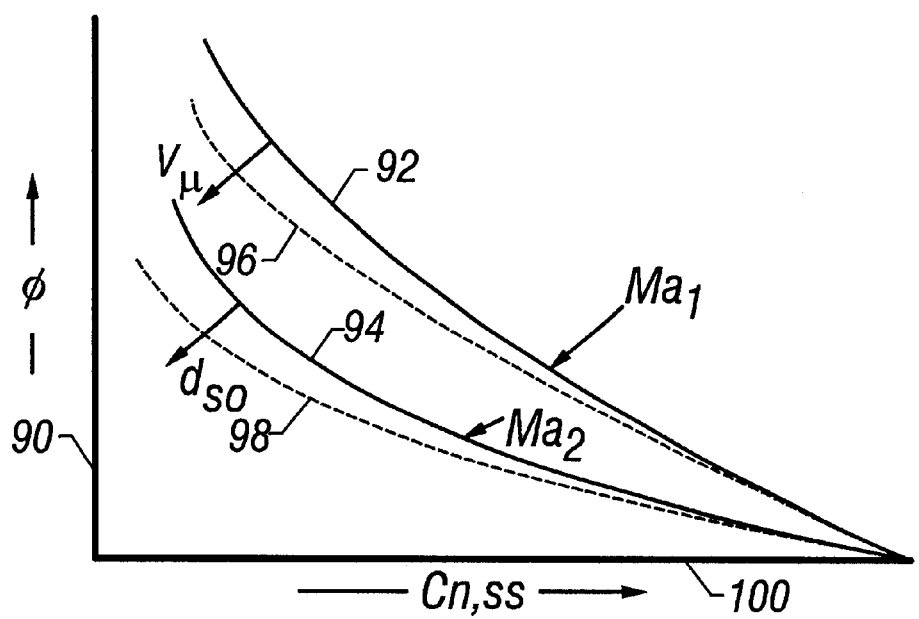

FIG. 3b illustrates a hypothetical functional relationship between the count rate $C_{n,ss}$ measured by the short spaced thermal neutron detector and $\emptyset_e$. Curves 92 and 94 illustrate this relationship for two rock matrices $M_{a1}$ and $Ma_2$, respectively. For both curves $V_{sh}=0.0$ and there is no stand-off between the downhole subassembly 20 and the wall of the borehole 14. Defining $d_{so}$ as the stand-off distance, $d_{so}=0.0$ for both curves 92 and 94. As $V_{sh}$ increases in the formation, the curve will move to the left as depicted by the broken curve 96. Most shales contain neutron absorbers in a greater concentration than most rock matrices. For a given true effective porosity, the measured count rate $C_{n,ss}$ will, therefore, decrease as $V_{sh}$ increases moving the curve to the left as illustrated. As the downhole subassembly stands-off from the borehole wall in a liquid filled borehole, the sensor "sees" the intervening liquid as a portion of the formation with 100% porosity. As a result, the measured count rate decreases for a given true formation porosity as $d_{so}$ increases. Using as an example the curve 94 for the rock matrix $Ma_2$, the curve will move to the left with increasing $d_{so}$ as depicted by the broken line curve 98. The measured count rate $C_{n,ss}$ is, therefore, a function of $\emptyset_e$ as well as $V_{sh}$, Ma and $d_{so}$. There are other parameters which affect $C_{n,ss}$ such as the "excavation effect" as presented by F. Segesman and O. Liu (SPWLA Symposium, Dallas, May 2–5, 1971), but this effect is relatively small. In addition, a gas filled borehole will drastically affect the response of the thermal neutron detector although this is not common in MWD operations and relatively rare in wireline operations. For purposes of illustration, it can be stated mathematically that $$C_{Cn,ss}(\emptyset_e, V_{sh}, Ma, d_{so}) = F(\emptyset_e, V_{sh}, Ma, d_{so})$$

where $$F(\emptyset_e, V_{sh}, Ma, d_{so}) = K_{n,ss}[(a_2 e^{-b_2 \emptyset_e} + c_2 e^{-d_2 V_{sh}}) + e_2 F(Ma, V_{sh} + f_2 F(d_{so}, \emptyset_e)] \qquad (2)$$

where $K_{n,ss}$ is a known constant which is a function of the neutron source strength and the thermal neutron detector size and sensitivity, and $a_2$, $b_2$, $c_2$, $d_2$, $e_2$, and $f_2$ are also "known" calibration constants either measured by operating the sensor in known test formations or computed by mathematical modeling of the sensor. $F(M_a, V_{sh})$ is a known functional relationship expressing the effects of Ma and $V_{sh}$ upon $C_{n,ss}$, and $F(d_{so}, \emptyset_e)$ is a known functional relationship expressing the effects of $d_{so}$ and $\emptyset_e$ upon $C_{n,ss}$.

Following procedures outlined above, specific sensor models are obtained for the remaining sensors in the illustrative example and, for brevity, will be summarized as follows using previously defined nomenclature:

$$C_{sgr,v}(V_{sh}, \emptyset_e, Ma) = F_v(V_{sh}, \emptyset_e, Ma) \text{ for } v=1,2,\ldots w \qquad (3)$$

$$C_{n,ls}(\emptyset_e, V_{sh}, Ma, d_{so}) = F(\emptyset_e, V_{sh}, Ma, d_{so}) \qquad (4)$$

$$C_{sgr,ss}(\emptyset hd\ e, V_{sh}, Ma, d_{so}, d_{mud}) = F(\emptyset_e, V_{sh}, Ma, d_{so}, d_{mud}) \qquad (5)$$

$$C_{sgr,ls}(\emptyset_e, V_{sh}, Ma, d_{so}, d_{mud}) = F'(\emptyset_e, V_{sh}, M^a, D^{so}, d_{mud}) \qquad (6)$$

$$d_{so}(T_i, d_{mud}) = F(T_i, d_{mud}) \text{ for } i=1,\ldots h \qquad (7)$$

where $d_{mud}$ is defined as the density of the drilling mud.

Combination Sensor Responses

To continue the data processing example, assume that m raw sensor responses are measured and that the parameters of interest are $\emptyset_e$, $V_{sh}$ and three mineralogical constituents $f_1$, $f_2$, and $f_3$ which include the rock matrix Ma. In the preferred embodiment, the individual sensor response models as defined in the equation set (1) through (7) are rearranged into a system response model which, for the example being presented, can be written as a 5×m system response matrix [S] such that $$[P]=[S]\times[D] \qquad (8)$$

where [D] is the m measured raw sensor responses expressed as a m×1 data matrix and [P] is a 5×1 matrix comprising the five parameters of interest, namely $\emptyset_e$, $V_{sh}$, $f_1$, $f_2$, and $f_3$. The system response matrix [S] is stored within memory 48. The matrix multiplication of equation (8) is performed within the computer 50 and only the five exemplary parameters of interest are telemetered to the surface, or stored within memory 46 for subsequent retrieval, or both.

The number of energy windows used in the spectral natural gamma ray system is usually at least three but can be as great as ten or twelve or even more. The number of acoustic travel time measurements $T_h$ for each stand-off determination can be quite large. These measurements combined with other sensor measurements discussed in detail can yield data matrices [D] containing fifty or more elements (i.e. m≧50). Even using the relatively small subset of sensors, it is apparent that downhole processing of raw data to obtain parameters of interest reduces the volume of data that must be telemetered or stored by more than an order of magnitude. As an example, the previously mentioned simplified subsurface map or matrix can be updated and use combined values representing specific variations in lithology with minimal or reduced amounts of memory.

As noted earlier, the downhole subassembly also contains an array of multiple electromagnetic transmitters and multiple receivers. Measurements from these arrays are used primarily to determine the resistivity and dielectric constant of the formation which, when combined with other parameters, yield formation hydrocarbon saturation. If one or more acoustic transmitters and receivers are employed to obtain a third, independent porosity determination, large quantities of raw data will be used to compute a single "acoustic" porosity data point. If, therefore, a full set of formation evaluation and directional sensors are employed in the downhole subassembly 20, it would not be unusual for the number of raw data measurements m to exceed the number of parameters of interest n computed from these measurements by several orders of magnitude. Considering the available bandwidth available in current MWD systems, it is apparent that the transmission and processing of raw data at the surface while preserving reasonable vertical resolution would not be possible. Wireline quality "combination" logs can be obtained from the responses of sensors of multiple types only if processing is performed downhole. The same applies for storing data for subsequent retrieval. Current MWD downhole storage capacities can handle only computed parameters of interest rather than raw data.

The computed parameters of interest may be further used by the downhole computer as an input to determine other parameters of interest. For example, $V_{sh}$ may be used to discriminate porosity and resistivity data to determine whether the formation being logged or drilled is a reservoir or non-reservoir rock. $V_{sh}$ also may be used to as a determinate to modify the transmission sequence of data uphole. For example, when $V_{sh}$ is below a predefined value, say 0.2, the transmission sequence would be preferential to convolved answers and when $V_{sh}$ is above the predetermined value, then it may be desirable to transmit sensor data from a selected sensors for use in real time by the surface processor. Additionally, important answers such as water saturation "$S_w$", flushed zone saturation "$S_{xo}$" and recovery factor indicator "RFI", which are typically determined by utilizing wireline measurements, may be determined downhole during the drilling operations by utilizing other parameters of interest. An example of determining such answers is given below.

Determination of $S_w$, $S_{xo}$ and RFI is dependant upon the porosity of the formation. The formation porosity $\emptyset^t$ may be derived from the nuclear porosity device and the density device contained in the downhole subassembly as;

$$\emptyset_d = (\rho_{ma} - \rho_b)/(\rho_{ma} - \rho_f)$$

where typical matrix densities $\rho_{ma}$ for various rock types and fluid densities $\rho_f$ for various fluid are predefined. $\rho_b$ is the bulk density determined by a downhole sensor. The determination of the density porosity from the density assumes a knowledge of the matrix density and the fluid density. The matrix density may be determined from a density/neutron cross-plot or from a density/photoelectric cross-plot, which methods are known in the art. Matrix $\rho_{ma}$ and fluid $\rho_f$ densities may be preprogrammed and/or downloaded real time into the downhole computer. This enables updating such correction and characterization parameters as required, which is important in MWD applications, because the downhole environment constantly changes during the drilling operations.

A reasonable approximation of true porosity $\emptyset_t$ in liquid-filled zones is the average of the porosities determined by the neutron ($\emptyset_n$) and density ($\emptyset_d$) measuring devices, i.e., $$\emptyset_t = (\emptyset_n + \emptyset_s)/2$$

An approximation of true porosity in gas-bearing formations is $$\emptyset_t = ((\emptyset_n^2 + \emptyset_d^2)/2$$

Determination of gas bearing formations may be effected downhole by recognizing the "gas crossovereffect" in reservoir rock exhibited on the neutron and density porosity logs. The presence of neutron—density crossover may be configured as a single bit flag for transmission uphole and used as an input for selection of a porosity determination relationship.

With the downhole determination of the true porosity $\emptyset_t$, the following answers may determined as:

$$S_w = c(R_w/R_t)^{0.5}/\emptyset_t$$

$$Sxo = (c/\emptyset_t)(R_{mf}/R_{xo})^{0.5}$$

$$RFI = S_{xo} - S_w/(1-S_w)$$

where $R_t$, true resistivity, is measured from the deepest reading of the resistivity device, and $R_w$, resistivity of the water pores, is preprogrammed in the downhole computer and may be updated as the drilling proceeds. $R_{ox}$, resistivity of the invaded or flushed zone, is measured from the shallowest reading of the resistivity device. The element "c" is a constant having different values for different rocks. For example c is 1.0 for limestones and 0.9 for sandstone. $R_{mf}$, resistivity of the mud filtrate, for various mud types may be preprogrammed in the downhole computer and/or measured at the surface and transmitted during the drilling operations. The value of the mud filtrate resistivity Rmf is adjusted for downhole temperature effect by the computer prior to its use by known empirical relationships, such as:

Downhole $R_{mf}$=Surface $R_{mf}(T_s+6.77)/(T_d+6.77)$ where $T_s$ and $T_d$, respectively, are the surface and downhole temperatures.

Advantages of the invention with respect to determining formation evaluation parameters over the prior art MWD systems are numerous, some of which are outlined below. Other advantages will become apparent in the application relating combining the downhole computed parameters of interest with reference data and taking downhole corrective actions as a function of such parameters.

(1) A plurality of formation-evaluation sensors can be used since data processing is performed downhole and the use of limited MWD telemetry and storage is optimized. Parallel, rather than serial, processing of data from multiple types of sensors can be employed. Serial processing is common in both current MWD and wireline systems. As a simple example, formation porosities computed from acoustic travel time, neutron porosity and bulk density measurements are currently processed serially in that environmental corrections such as borehole size effects are first made to each measurement and the environmentally corrected determinations are then combined to obtain previously discussed formation lithology and improved formation porosity measurements. The current invention allows the correction of all sensor measurements in parallel for environmental effects and computes the desired formation parameters simultaneously since the response matrix of the sensor combination is used rather than three individual response relationships for the acoustic, neutron porosity and bulk density measurements, with subsequent combination of parameters individually corrected for environmental effects. This reduces propagation of error associated with environmental corrections resulting in a more accurate and precise determination of parameters of interest. Parallel processing is possible only through the use of downhole computation because of data transmission and storage limitations.

(2) Only computed formation parameters of interest, rather than the raw sensor data, are telemetered or stored. As a result, telemetry and storage capacity is also available for the determination of additional, non-formation type, yet critically important parameters, such as drilling dynamics and the operational status or "health" of all downhole measuring systems. This reduces drilling costs and insures that measured data and resulting computations are valid.

(3) Since downhole computation reduces the volume of data that must be telemetered to the surface and since the telemetered data are parameters of interest, real-time decisions can be made based upon these measurements. As an example, in the drilling of horizontal boreholes within a selected formation, real-time formation parameters are transmitted to the surface. If these parameters indicate that the drill bit is approaching the boundary of the selected formation or has passed out of the selected formation, the logs indicate this excursion in real time so that the driller can take remedial steps to return the bit to the selected formation. This is referred to as "geosteering" in the industry and, again, is optimized by the current invention in that downhole computation and subsequent telemetering of only parameters of interest does not exceed available band width.

(4) The quality of combination-type formation evaluation parameters which can be determined with the current invention are comparable to wireline measurements and thereby eliminate partially or completely the need to run wireline logs at the completion of the drilling operation. This results in a substantial cost savings in either the completion or abandonment of the well.

Applications of the System Using Reference Data

The following is presented as an overview example of the correlation of parameters of interest determined within a drilling well with external reference data. For purposes of illustration, assume that the MWD subassembly 20 contains a plurality of sensors 52 whose responses can be combined in real-time using previously discussed methods to obtain the parameters of interest of formation porosity, lithology and resistivity. Assume further that reference data comprises porosity, lithology and resistivity logs from surrounding wells, as well as the dip and strike of certain formations of interest. This information is stored in the second downhole storage means 48 which will be referred to as the reference data memory. The reference data contains sufficient information to predict the depth within the drilling well at which formations of interest will be penetrated. Real-time measures of porosity, lithology and resistivity in the drilling well are continuously compared or correlated with porosity, lithology and resistivity, along with formation strike and dip predicted by the reference data. The degree of correlation or correlation coefficient is telemetered to the surface. As long as correlation remains good, the driller is assured that the well is being drilled within the targeted fault block and that a fault plane has not been encountered. Should, however, the correlation between the drilling and reference parameters suddenly degrade, the driller must surmise that an unexpected fault plane has been penetrated. Changes in the drilling program can be made accordingly at the time the problem is encountered. Without real-time correlation of drilling and reference data, a significant amount of borehole could be drilled within the unexpected fault block resulting in wasted time and money.

Figure 4A:
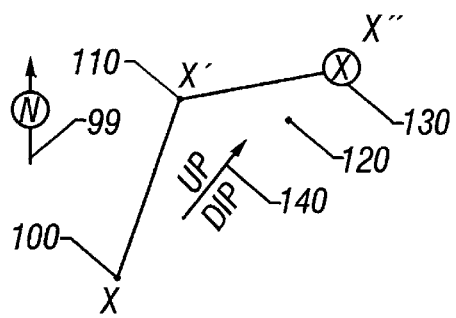
FIGS. 4a–4c illustrate the combination of MWD log data and offset log reference data to ensure that the drilling program is meeting predetermined objectives.
Figure 4B:
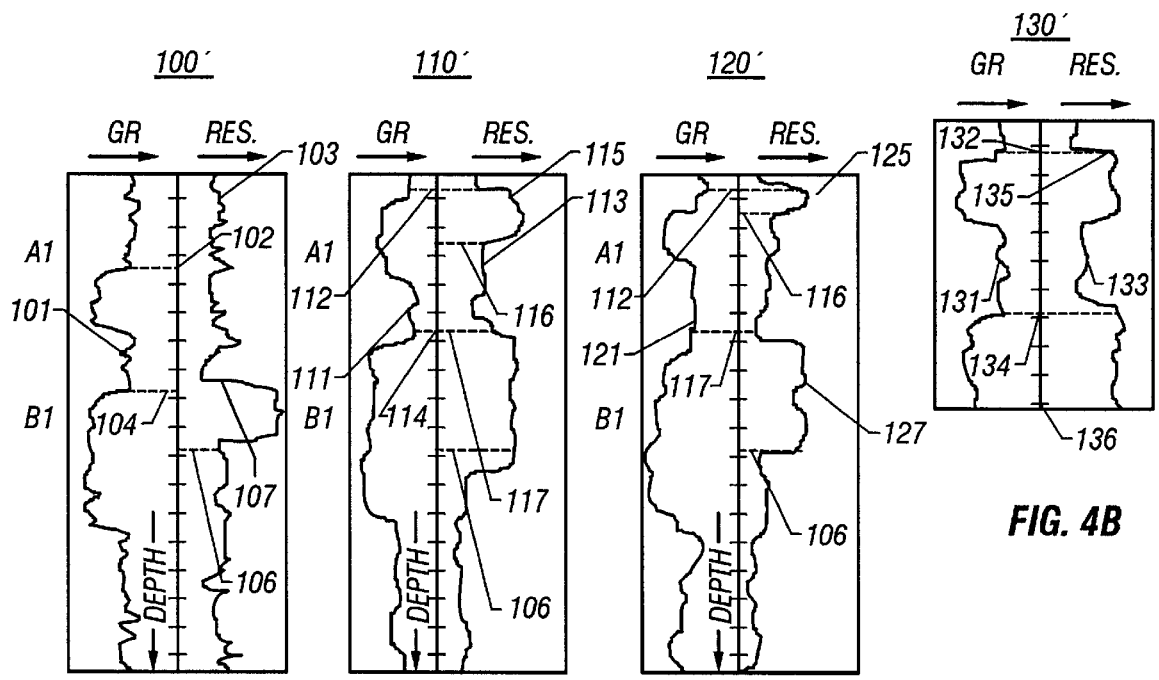

Specific examples of combining the stored reference data with the parameters of interest measured during the drilling operations will now be described. In the following examples, reference data will be of the form of offset log data and seismic data. FIG. 4a illustrates the geographical location of three existing wells identified by the numerals 100, 110 and 120. North is specified by the arrow 99. Combination natural gamma ray and resistivity logs measured in the existing wells 100, 110 and 120 are shown in FIG. 4b across the shale sand sequence of interest and are identified in general by the numerals 100', 110' and 120', respectively. More specifically, the natural gamma ray log 101 measured in well 100 shows the top of the sand labeled "A1" at a depth indicated by the numeral 102. The same gamma ray log shows the top of a second sand labeled "B1" at a depth indicated by the numeral 104. The resistivity log measured in the same well and identified by the numeral 103 indicates no increase in resistivity in the A1 sand indicating that the sand is filled with saline water. The measured resistivity does show an increase in resistivity 107 in the top of the B1 sand indicating that the sand is partially saturated with oil with an oil-water contact at the depth 106. Turning next to the combination log 110' run in well 110, the A1 sand is again seen on the gamma ray log 111 but with a top at a depth 112 which is shallower than the corresponding A1 sand top in well 100. The B1 sand is also clearly delineated by the gamma ray log 111 with a top at the depth 114 which is likewise shallower than the top of the B1 sand in well 100. The resistivity log 113 measured in well 110 shows an increase in resistivity 115 in the A1 sand indicating oil with an oil-water contact at the depth 116. The increase in resistivity 117 in the B1 sand likewise indicates partial oil saturation with an oil-water contact again at a depth 106. Finally, the combination natural gamma ray and resistivity log measured in well 120 and identified in general by the numeral 120' indicates the top of the Al sand again at the depth 112, the oil-water contact within the A1 sand again at the depth 116, the top of the B1 sand at the depth 114, and the oil-water contact within the B1 sand at the depth 106.

Figure 4C:
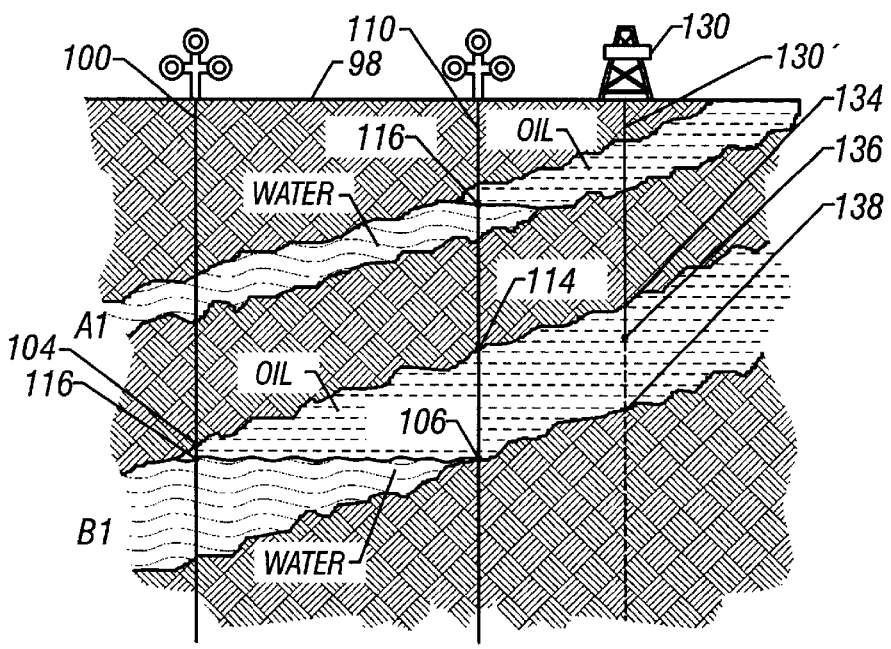

By comparing the logs 100', 110' and 120' with the geographical locations of the three wells 100, 110 and 120, it is apparent that the beds are dipping in an upward direction toward the north east as indicated by the arrow 140. It is desirable to locate the well to be drilled "up-dip" from the existing wells, and this optimum location is denoted by the numeral 130 in FIG. 4a. FIG. 4c depicts a cross section X-X'-X" which includes existing wells 100 and 110 and the drilling well 130. The surface of the earth is identified by the numeral 98. The proposed path 130' of the drilling well penetrates the A1 sand where the bottom of the sand is above the oil-water contact at the depth 116. Likewise, the proposed path of the drilling well penetrates the B1 sand where the bottom of the sand is above the oil-water contact at the depth 106. This location will, of course, maximize production from both sands.

It is desirable to store the entire logs 100', 110' and 120' within the memory 48 of the downhole subassembly 20 such that the MWD logs 131 and 133 obtained while drilling the well 130 can be continuously compared with the "reference" logs. This continuous comparison assures the driller that the borehole is, in fact, being drilled along the planned path 130' and that no unexpected discontinuities have been encountered. Available memory 48 will usually prohibit the storing of the entire reference logs. Alternatively a much smaller set of reference data can be stored within the memory 48. This abbreviated set of reference data includes the depths of the tops and bottoms of the formations of interest, the strike and dips of these formations, the projected tops and bottoms of these formations at the points of intersection with the drilling well, and the log readings within the formations of interest and within adjacent beds. As an example, a combination MWD gamma ray and resistivity log, indicated in general by the numeral 130', shows first that the drilling operation has reached a depth 136. In addition, the MWD gamma ray log 131 and the MWD resistivity log 133 indicate that the A1 sand has been penetrated with the top "up dip" at a depth 132 as predicted from the extrapolation of the offset log data. The driller, based upon MWD measurements and projections and log readings from offset log data, is assured that the drilling operation is proceeding as planned and that no formation discontinuities have been encountered.

Attention is now turned to the use of offset well log and seismic information as reference data. The locations of existing wells 100, 110 and 120 are again shown in FIG. 5a with north being indicated by the arrow 99 and the northeast direction of upward dip of the formations of interest again being illustrated by the arrow 140. In this example, the formations are not continuous but are interrupted by a fault 141. The top of the fault plane is shown in FIG. 5a and lies between the locations of the existing wells and the location of the drilling well 130'. FIG. 5b again depicts the cross-sectional view X-X'-X" which illustrates the down-thrust portion of the fault to the northeast. The A1 sand is sealed from its counterpart A2 sand on the down-thrust side of the fault 141. The B1 sand is likewise sealed from its counterpart B2 sand on the down-thrust side of the fault.

The drilling well 130' has been drilled to a depth indicated by the numeral 136' with the target depth being indicated by the point 180 and the intended path for the borehole being designated by the broken line 178. The well plan is to penetrate the oil bearing portions of the A1 and B1 sands near the fault plane which will maximize the up dip production on the down-thrust side of the fault 141. Prior to drilling, it is not known whether the A2 sand contains oil. As in the previous example, pertinent reference data from the logs of wells 100, 110 and 120 are stored within the memory 48 of the downhole subassembly 20. Preloaded offset well data can be enhanced by the aforementioned "look ahead" sensor measurements. In addition, coordinates of the fault plane are also stored within memory 48. Tops of the A2 and B2 sands, which can be determined with seismic data with much less resolution than from log data (if it were available), are also stored within the memory 48.

Figure 5C:
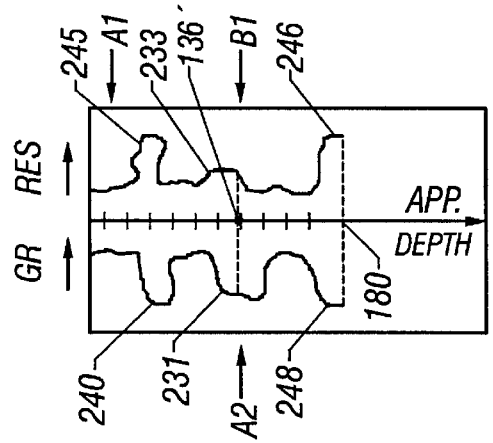
FIGS. 5a–5c illustrate the combination of MWD log data, offset log data and seismic data to ensure that the drilling programs is meeting predetermined objectives.
Figure 5A:
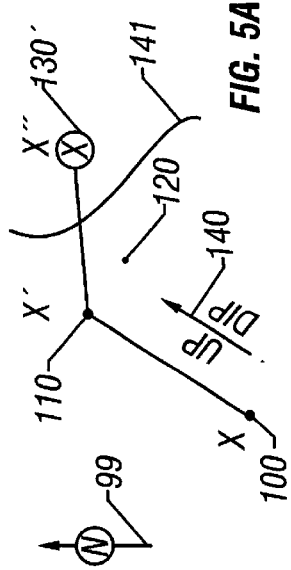
Figure 5B:
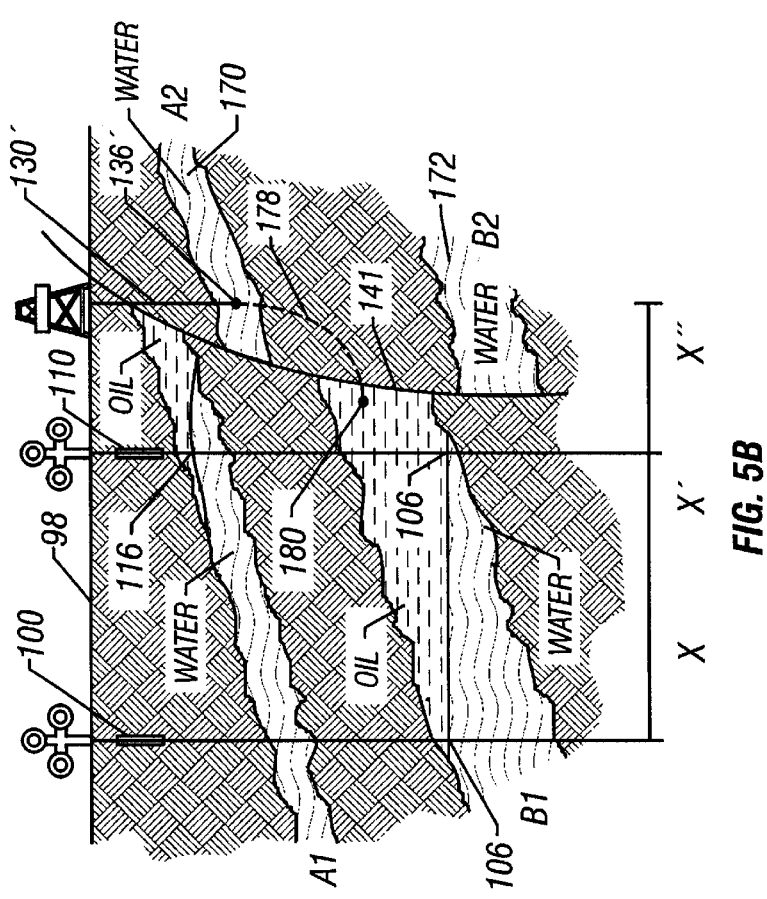

FIG. 5c illustrates the MWD gamma ray and resistivity logs identified by the numerals 231 and 233, respectively. The current drilling depth is designated by the numeral 136'. The excursions 240 and 245 of the gamma ray log indicate that the A1 and A2 sands were penetrated as predicted by the offset log and seismic data. The low resistivity reading in the A2 sand indicates that this sand is saturated with saline water, at least at the intersection with the borehole 130'. MWD log readings predicted by the stored log and seismic reference data from the current drilling depth 136' to the final or "total" depth 180 are illustrated as broken curves 248 for the gamma ray log and broken curve 246 for the resistivity log. If the actual MWD log readings agree with the predicted gamma ray and resistivity log readings 248 and 246, respectively, the driller is assured that the borehole is tracking the targeted path. Should deviation between actual and predicted log readings occur, the driller has early warning that either drilling has deviated from the desired direction or unexpected geological anomalies have been encountered.

In the foregoing examples, only gamma ray and resistivity measurements were used as parameters of interest for brevity and that the invention as disclosed allows many additional parameters of interest to be measured. In addition, the two-way communication feature described previously allows different parameters of interest to be selected while drilling and allows the response models of the sensors to be changed while drilling should unexpected geological features be encountered while drilling. In addition, drilling direction can be adjusted based upon geophysical parameters measured while drilling.

Some of the advantages over prior art of the embodiment of the invention in which parameters of interest are correlated downhole with reference data are briefly summarized as follows:

(1) The penetration of unexpected geological anomalies such as fault planes and lenses can be detected in real-time allowing remedial steps to be taken more quickly and cost effectively.

(2) Seismic data can be tied in with logging data during the actual drilling of the well.

(3) Depth control of extended drilling within a given well can be obtained to a high degree of accuracy by using data measured within the given well during prior passes as reference data.

(4) Drilling dynamics measurements from prior passes within a given well can be used as reference data to optimize the drilling program to extend the well to total depth.

(5) Indications in real-time that the target formation has been reached can be obtained by correlating reference data comprising geophysical properties of the target formation with corresponding measured parameters of interest.

(6) The accuracy and precision of computed parameters of interest within the drilling well can be optimized by storing additional sensor response matrices as reference data. If dictated by changes in environmental conditions, an alternate sensor response matrix can be used to compute improved parameters of interest.

(7) Acoustic measurements provide the ability to obtain information about the subsurface formations lying ahead of the drill bit. Such measurements can be used to preset or precondition other shallow measurements prior to the drill bit entering such zones. In addition, a simple form of subsurface map or matrix can be created to enhance the preset parameters for those shallow investigating sensors.

Figure 6:
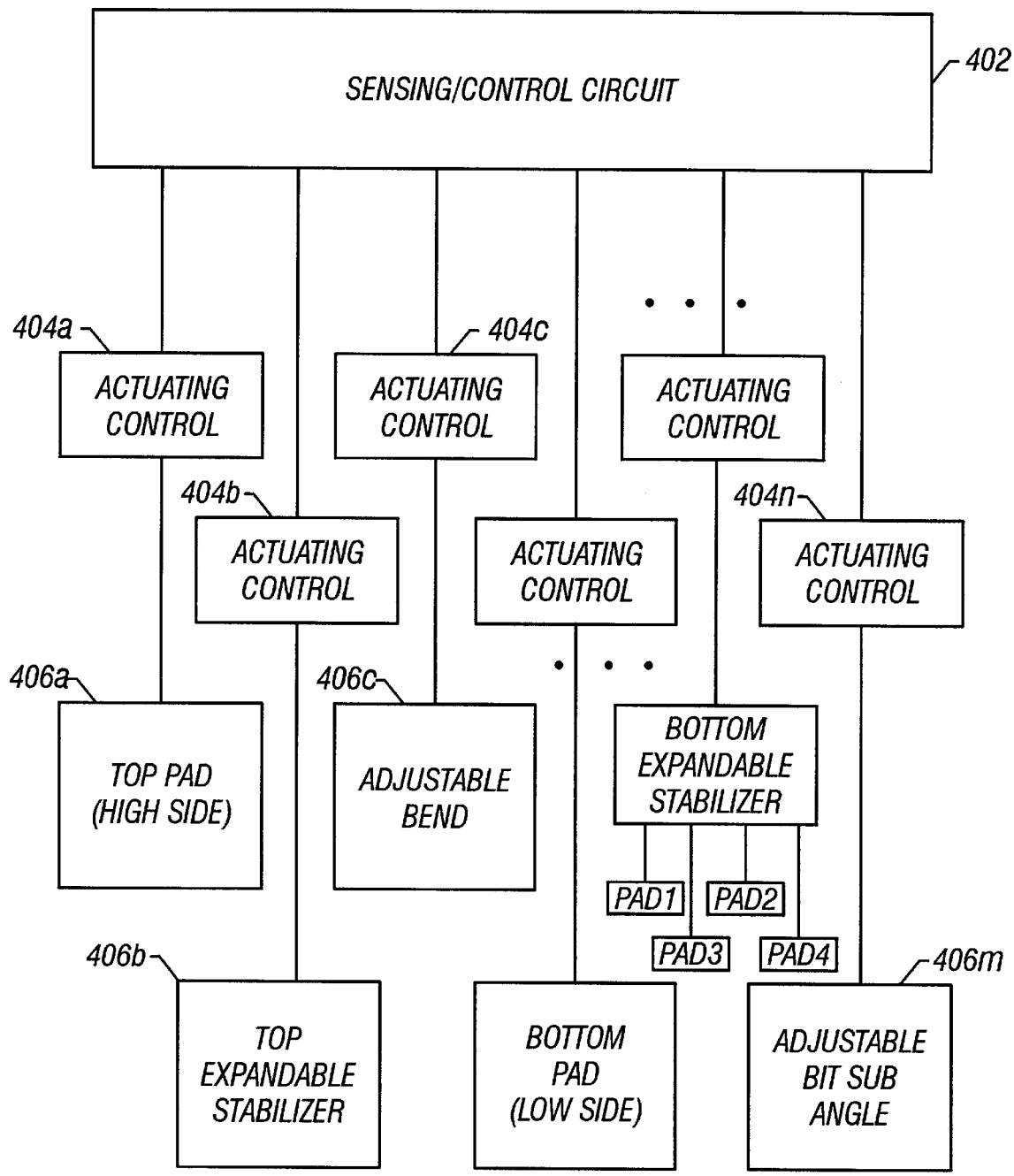
FIG. 6 shows a functional block diagram of control circuits for the downhole control of deflection devices shown in FIG. 1c.

The use of the system of the invention for altering the drilling direction without retrieving the drill string will now be described in more detail. In one embodiment the downhole computer has stored therein the predetermined borehole path that is adapted to be updated by surface transmitted signals. During the drilling of the borehole 14, the downhole computer continually determines the true depth of the drill bit preferably from the downhole computed depth measurements as described and determines any deviation therefrom. If the deviation is greater than a predetermined amount, it causes one or more of the downhole deflection devices, such as the adjustable stabilizer pads and the adjustable bend, to correct the drilling direction. FIG. 6a shows a functional block diagram for controlling the deflection devices. The directional response function model for the particular downhole assembly being used for drilling the borehole is programmed in the computer. The computer 50 cooperates with the sensing and control circuit 402 to cause the desired actuating control circuits 404a–n to control their respective devices 406a–n, in response to programmed instructions and/or surface transmitted signals during the drilling operations. The particular deflection devices chosen to adjust the drilling direction and the amount of change effected by each such device depends upon the nature of the desired change. Thus, the system makes closed loop decisions to adjust the downhole assembly to drill along a desired path and/or along a particular pay zone.

Figures 7A, 7B, 7C, 7D:
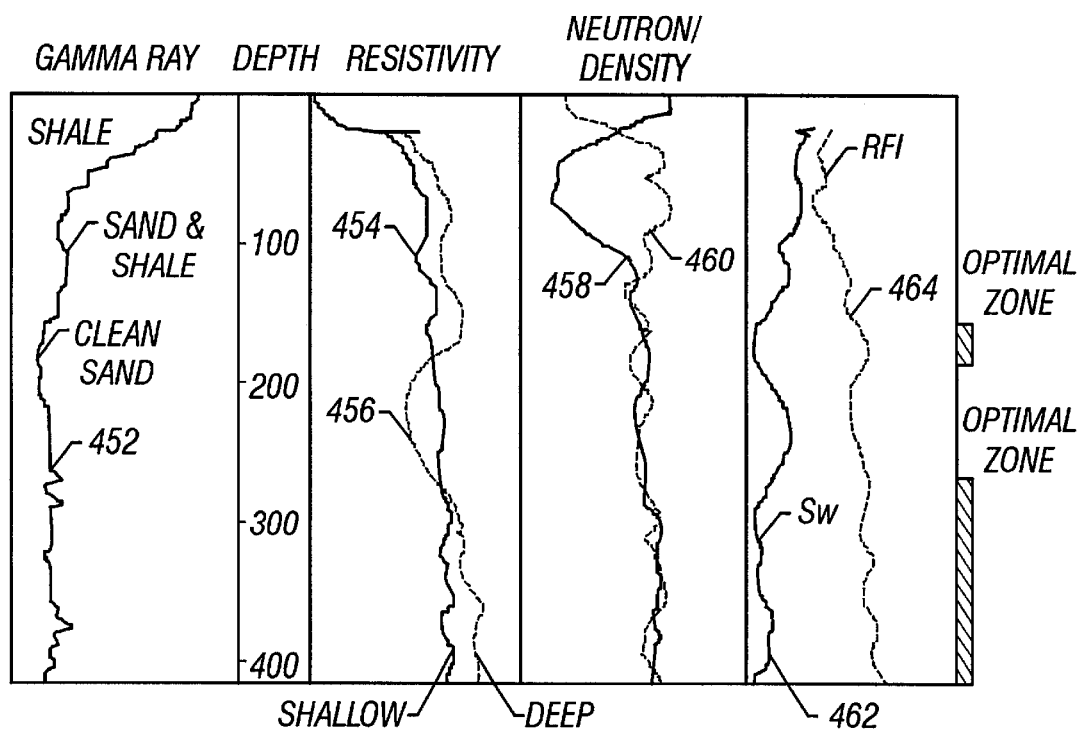
FIGS. 7a–7d show logs of certain parameter measured downhole by the system shown in FIG. 1a and corresponding downhole-computed parameters of interest.
Figure 7E:
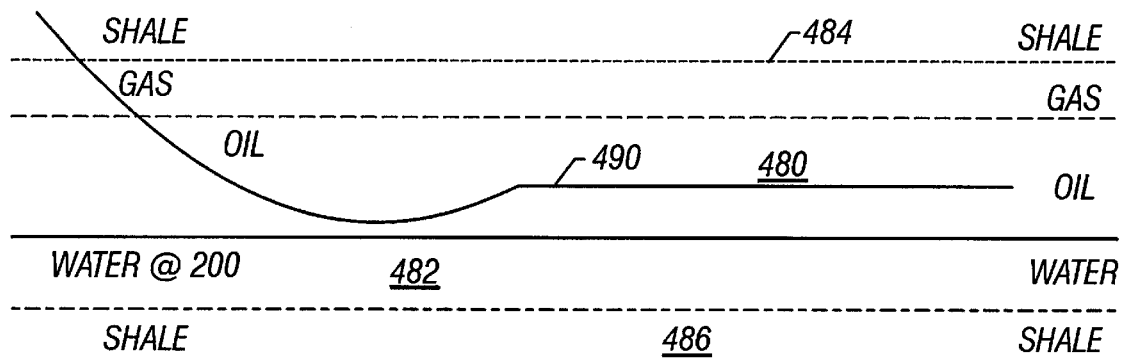
FIG. 7e shows a schematic diagram of a borehole path maintained by the system of the present invention as a function of the downhole-computed parameters of interest.

FIGS. 7a–e show another example illustrating how the present system may be utilized to maintain the drilling within a desired pay zone 500. FIGS. 7a–c respectively show examples of the gamma ray logs as a function of the borehole depth, preferably determined downhole. FIG. 7d shows water saturation and RFI logs computed by the downhole computer as described earlier. In FIGS. 7a–d, the parameter values are shown along the vertical direction as a function of the borehole depth or location. Track 452 is the gamma ray log with a shale bed at the top followed by a mixed sand shale (fining) upward) sequence followed by a clean sand starting at depth of about 160 depth units. Tracks 454 and 456 respectively show the shallow and deep resistivity values. Track 458 and 460 respectively are the neutron and density porosities. The neutron and density crossover from 020 to 090 depth units indicates a gas bearing zone. Tracks 462 and 464, respectively, depict downhole computed answers for water saturation Sw and recovery factor index RFI. FIG. 7e shows a horizontal portion of the borehole which relates to the logs shown in FIGS. 7a–d.

Bed boundary avoidance can be predicted from monitoring acoustic and/or the various resistivity responses. For example, at 200 depth units, the deeper resistivity track 456 shows the influence of the nearby water zone 482. When the downhole computer determines such a situation, it can cause the drill string to change the drilling direction away from the water zone 482, which may be done by adjusting one of the deflection devices as described earlier. Once the underlying bed boundary has been successfully avoided, the optimal position of the wellbore within the pay zone needs to be determined. To accomplish this, the downhole computer may be programmed to analyze the answer curves 462 and 464 to determine the borehole depth and the true vertical depth of the optimal water saturation $S_w$. The computer then continues to control the drill string direction so as to maintain the drilling at the optimal vertical depth as shown by the curve or a predetermined range thereof.

Two-way Communication System

As described earlier, the system of the invention utilizes a two-way communication system for transmitting data between the surface processor 32 and the downhole subassembly 20. The preferred two-way telemetry system and its use in the system of this invention will now be described in detail while referring to FIGS. 1, 2, 8–10. For convenience, the elements that correspond between different figures are referred to by the same numerals.

Figure 8:
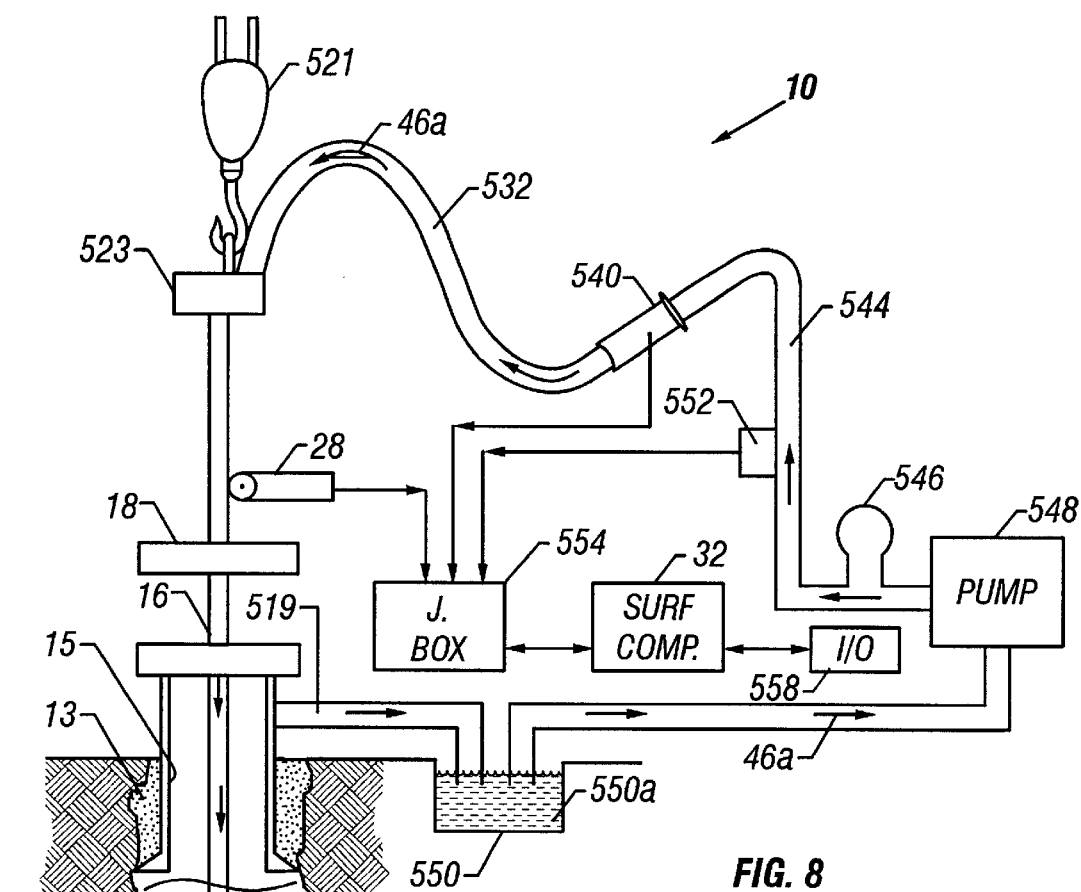
FIG. 8 shows the system of FIG. 1a with major elements of a two-way data communication between the downhole subassembly and the surface processing equipment.

FIG. 8 shows a schematic block diagram of the major components of the surface telemetry element 30 shown in FIG. 1. In the present invention, drilling fluid or mud is the preferred communication medium and therefore the description provided herein relates generally to a telemetry system utilizing such a medium. Other communication paths, however, may be utilized for this invention.

Referring to FIG. 8, drilling mud 550a is drawn from a reservoir 550 by a mud pump 548. The mud pump 548 circulates mud at a high pressure through the standpipe conduit 544 and through the flexible kelly hose 532, to the injector head 523 which terminates the upper end of the drill string 16. The surface telemetry element 30 includes a downlink transmitter 540 and a uplink receiver 552. The downlink transmitter 540 is preferably located between standpipe conduit 544 and the flexible kelly hose 532. The downlink transmitter 540 preferably is a variable frequency modulator. It, however, may be a pulsed modulator system, an acoustic wave generator, or a pressure pulsed system. The uplink receiver 552 is positioned at a suitable place on the standpipe 544. The operation of the transmitter and receiver will be described later.

A surge protector 546 is located between the standpipe 544 and the mud pump 548 in order to reduce pulsation caused by the reciprocating action of the pump. The drill string 16 is supported by a crown assembly 521 which cooperates with a drawworks (not shown) to raise and lower and thereby convey the drill string along the borehole 14. The drilling fluid is pumped under pressure through the drill pipe and the downhole subassembly 20. The drilling fluid leaves the drill string 16 at the drill bit 12 and returns to the surface by flowing through the annulus between the borehole and the drill string 16. The mud then returns to the mud pit 550 via the return pipe 519.

Data from the downhole subassembly 20 are transmitted to the surface by a modulated signal induced downhole within the mud column and subsequently detected at the surface by the uplink receiver 552. Data and command signals from the surface are preferably transmitted downhole as a frequency modulated wave train induced in the mud column by the downlink variable frequency modulator transmitter 540, which signals are subsequently detected downhole by one or more pressure transducers (not shown). Signals from the depth-indicating device 28 are transmitted to the junction box 554 which cooperates with the surface processor 32 as described later. The surface processor 32 cooperates with the downlink transmitter 540 through the junction box 554 and also receives signals from the uplink receiver 552 through the junction box 554. An input/output unit 558 serves as means for entering the parameters into the processor 32 as well as means for recording and displaying parameters of interest determined by the system of the invention.

As shown in FIG. 2a, the downhole portion of the telemetry system has a downlink receiver 42a and an uplink transmitter 42b. The downlink receiver 42a includes one or more pressure transducers and is preferably mounted in close proximity to the downhole computer 50. The uplink transmitter 42b, preferably has a poppet valve positive displacement mud pulse transmission system. Alternatively, the uplink transmission system may comprise a variable frequency modulator, an acoustic wave generator, or other pressure pulsing means compatible with the mud column communication path. If another communication path is used, the transmission and receiving means compatible with the such communication path are likewise used. The uplink communication path, which includes frequency modulated pressure pulses induced within the mud column, is illustrated conceptually by the dotted line 27. The downlink communication path, which includes the frequency modulated pressure wave train induced within the mud column by the variable frequency modulator transmitter, is illustrated conceptually by the dashed line 29.

Figure 9:
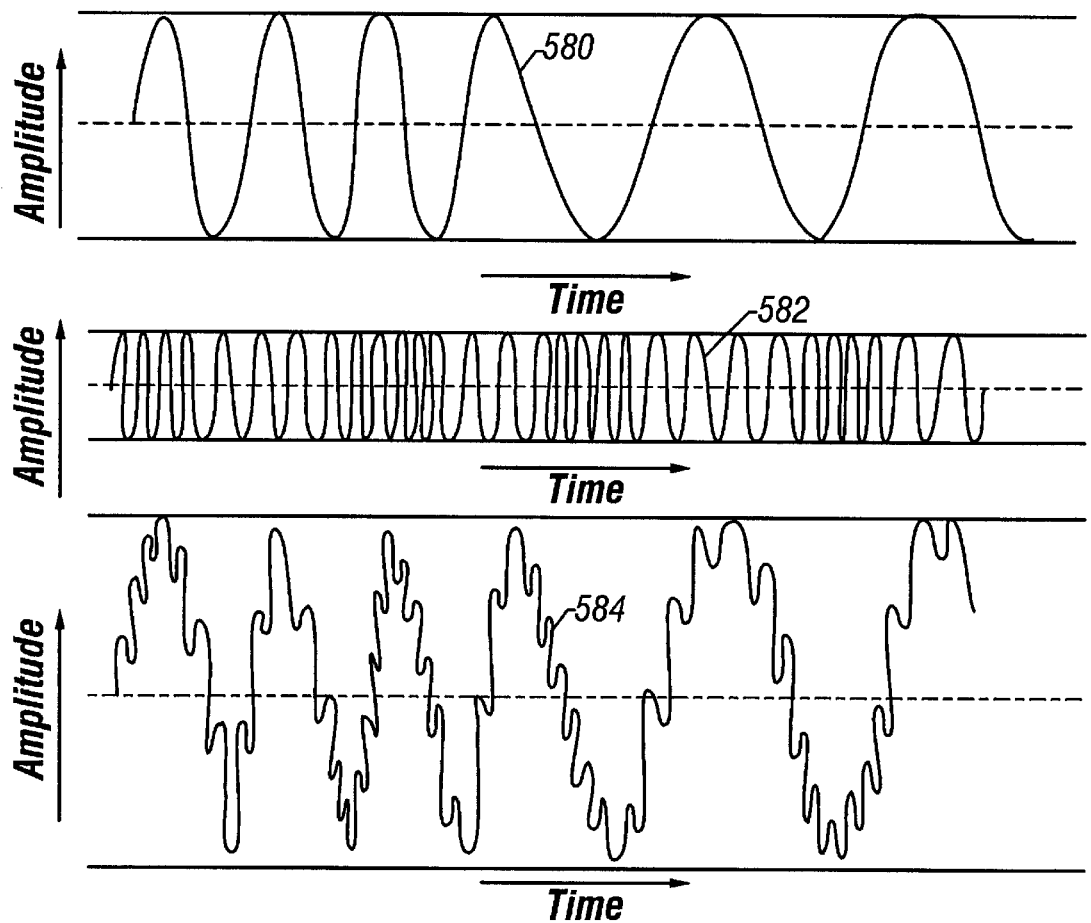
FIG. 9 shows examples of mud pulses for use with the two-way data communication system of FIG. 8.

The use of the telemetry system of the present invention will now be described while referring to FIGS. 8 and 9. FIG. 9 shows three pressure wave trains within the mud column with relative pressure amplitude being plotted as a function of time. The curve identified by the numeral 580 represents a frequency modulated signal induced within the mud column by the positive pulse uplink transmitter 42b. The curve denoted by the numeral 582 represents a frequency modulated wave train induced within the mud column by the downlink variable frequency modulator transmitter 540. If wave trains 580 and 582 are simultaneously induced within the mud column, a composite wave train represented by the curve 540. If wave trains 580 and 582 are simultaneously induced within the mud column, a composite wave train represented by the curve 584 will be detected by both the uplink receiver 552 and the downlink receiver 42a. The composite wave train is encrypted using methods and apparatus of the invention such that uplink data can be extracted by the surface computer 32 and downlink data can be extracted by the downhole computer 50. As an example, processing at either the surface or downhole computers can be "tuned" to the desired carrier frequencies. Stated another way, variable frequency modulator type and pulse type transmission sequences can reside on, and be decoded from, one transmission channel.

Figure 10:
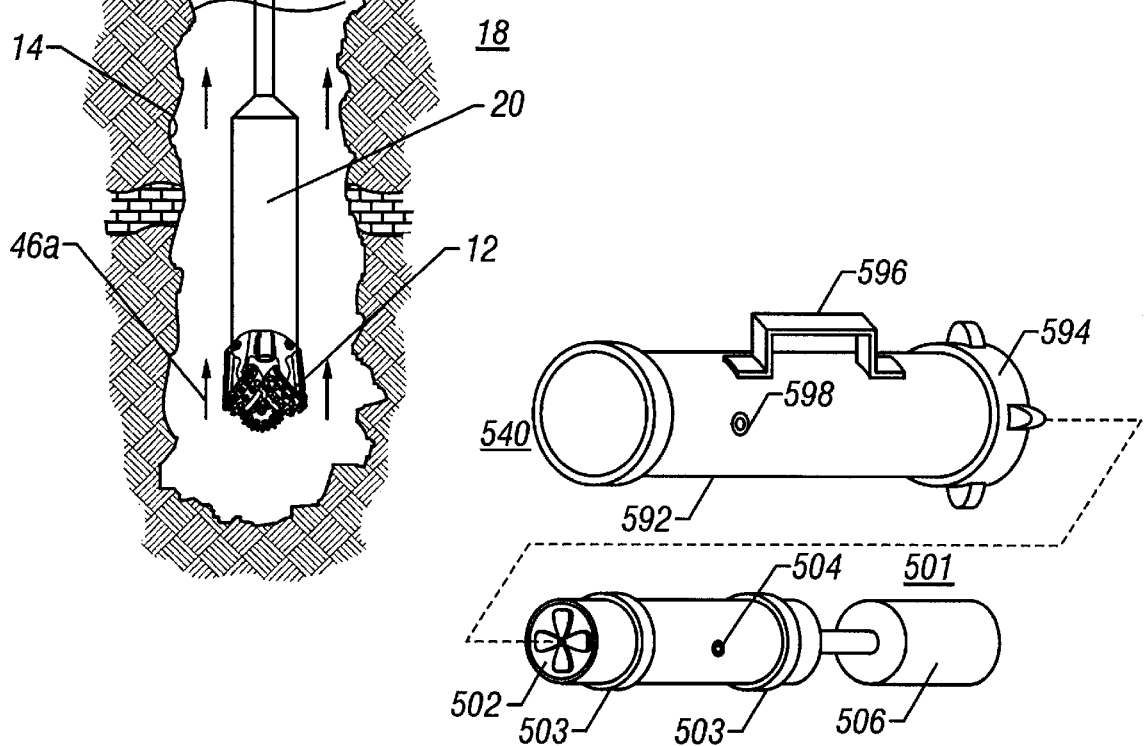
FIG. 10 shows an embodiment of a variable frequency modulator downlink transmitter for use with the system of the present invention.

An embodiment of the variable frequency modulator downlink transmitter 540 is shown in FIG. 10. The transmitter 540 is connected between the standpipe 544 and the flexible kelly hose 532 preferably with knock-on connector 594 being used to connect with the stand pipe 44. This means for connection permits easy access at the rig site for replacement and configuration of the internal transmitter/turbine assembly. The housing 592 is preferably pressure rated at 20,000 psi and is approximately 2.5 feet in length or even shorter so as not to interfere with the movement of the kelly hose 532. A handle 596 is provided for ease of handling by personnel at the rig site. The transmitter/turbine assembly, identified generally by the numeral 501, is triaxially mounted within the housing 592. The transmitter portion of this assembly, identified as a unit by the numeral 502, comprises a rotor/stator, driving motor and electronic components used to regulate the modulation of the carrier/data wave train. This section is sealed with o-rings 503 within the housing 592 is accomplished by means of a cable in which one end penetrates the housing 592 at the feed-through 598 and contacts the transmitter at internal connector 504. The turbine or power supplying section, 506 is located "up stream" from the transmitter section 502. In this embodiment, the flow of the drilling mud provides power to the transmitter 502. In an alternative embodiment, power is supplied directly to the transmitter 502. In an alternate embodiment, power is supplied directly to the transmitter in parallel with the data transmission cable through feed through 598 and connector 504. This embodiment may, however, compromise the intrinsic safety of the device and may also shorten the life of the drive motor unless a switch (not shown) activated by the flow of the mud is employed. In another embodiment, a switch (not shown) is used to activate the transmitter 502 only when a predetermined pressure level within the standpipe 544 is exceeded.

With reference to FIGS. 8–10, use of the two-way telemetry system will now be described by way of an example involving depth tracking and transmission of data and commands from the surface so as to illustrate the sequence of telemetry events. During the power-up phase of the drilling operation in which the mud pump 548 is activated and mud circulation is initiated, the downlink transmission sequence sends the downhole computer 50 reference parameters such as the absolute depth at which the downhole assembly 20 is located within the borehole, the current weight of the mud, and the resistivity of the mud. The latter two parameters are used in the previously defined sensor response models and sensor combination models which are stored within the second downhole storage means 48. Additional information such as commands identifying which stored sensor response models and/or which stored sensor combination models should be used to process the raw sensor response data over the next drilling interval is communicated to the downhole subassembly. In addition, specific parameters within these model s can be changed to optimize the computation of parameters of interest. These data are entered at the input/output unit 558 from which they are transferred to the surface computer 32, the junction box 554, and then to the downlink variable frequency modulator transmitter 540. Simultaneously, "non-rotating" information such as directional information is transmitted from the uplink transmitter 42b and is received at the uplink receiver 552. The uplink transmission sequence is programmed to transmit a single sync bit after the initial downlink transmission sequence has been completed. This sync bit confirms, at the surface, that the power-up transmission sequence has been received and properly decoded by the downhole computer 64. The initial power-up sequence is relatively data intensive transmissions and takes place while the drill string is not rotating and downhole "noise" is at a minimum.

After the initial power-up transmissions and drill string rotation is initiated, transmission sequences will switch to a single bit transmission triggered by relative depth intervals measured by the depth indicator 28 or 230 (FIG. 1b). The previously described absolute depth measurement stored in a time/depth file of the downhole computer 50 is reconciled with the transmitted incremental depth indications, which allows the downhole computed parameters of interest to be tracked with depth within the borehole at which they are determined. In addition, commands which are not data intensive can be transmitted to the downhole subassembly 20 while drilling.

A typical downlink transmission sequence is summarized as follows:

| TIME (seconds) | TRANSMISSION FREQUENCY (Hz) | OPERATION |
|---|---|---|
| 0–25 | 12.5 carrier | Initiate flow, power-up sync downhole computer. |
| 10–25 | 12.5–9 (3 bits/sec.) | 45 bit absolute depth, mud weight mud resist., etc. |
| 25–30 | 12.5 | Re-sync downhole computer |
| 30+ | 12.5–10 (up to 2 bits/sec) | 1–10 Hz bit = + 1 foot of bit depth |
| 30+ | 12.5–15 (up to 2 bits/sec) | 1–15 Hz bit = − 1 foot of bit depth |

After the initial power-up sequence, the computed parameters of interest are transmitted by the uplink transmitter 42b where they are sensed by the uplink receiver 522, transferred to the junction box 554 and then to the surface computer 556 for possible additional processing and then to the input/output unit 558, where they are displayed preferably as a function of depth thereby forming a well log.

As discussed previously, the two-way communication system as disclosed gives great flexibility in the management of data transmitted, downlink as well as uplink. Many decisions can be made in real time that are not possible using prior art systems. Finally, by changing key parameters of sensor response models or sensor combination models, while drilling, the accuracy and the precision of measured parameters of interest are maximized.

The surface computer or processor 32, downhole computer 50, and the two-way communication system described above cooperate to optimize data transmission between the downhole subassembly and the surface equipment and downhole storage of information. The use of limited telemetry bandwidth or limited downhole storage capacity to transfer to the surface (a) formation evaluation data, (b) data pertaining to the drilling operation and (c) downhole subassembly operations. Also, the accuracy and precision of parameters computed downhole is optimized by adjusting models and algorithms stored downhole based upon changing environmental conditions during the drilling operations. A method to achieve such optimization is described below.

As discussed earlier, the downhole computer 50 is used to transform raw sensor response data into formation evaluation, drilling dynamics and bottom hole assembly parameters of interest. Transformation models may be divided into two types. The first type will be referred to as "sensor response models" for each sensor. As an example, a sensor response model for a nuclear sensor having a neutron source and a thermal neutron detector is used to transform the primary sensor measurement, which is counting rate, into an "engineering" parameter which is related to the number of hydrogen nuclei per unit volume of earth formation in the vicinity of the sensor. The second type of transformation algorithm will be referred to as the "sensor combination model" which, as an example, might comprise an algorithm for combining hydrogen index determinations from a thermal neutron sensor with formation acoustic compressional wave velocity from an acoustic sensor to yield the parameters of interest which are formation porosity and formation lithology.

Sensor response and sensor combination models can reside in the memory of the downhole computer 50. Preferably, these models are stored in the second downhole storage means 48. The second downhole storage means 48 cooperates with the downhole computer 50 and the downlink 29 of the telemetry system in a manner described later. For certain parameters of interest, the corresponding depths within the borehole at which the raw sensor data are measured are also tracked. Depth of the downhole subassembly is telemetered downhole thereby providing means for assigning a corresponding measured depth to each computed parameter of interest. By transforming raw sensor data into parameters of interest or "answer", the total volume of data is compressed thereby reducing demands on the system uplink telemetry and downhole storage capacity. The two-way communication link is used to manage the acquisition and the transmission of data to the surface, thereby further optimizing the utilization of available uplink telemetry and downhole storage capacity.

Changing conditions during the drilling operations change the environmental conditions under which the downhole sensors operate. As an example, it is usually necessary to adjust the weight of the drilling fluid or "mud" rather frequently during the drilling operation. Changes in mud weight and mud composition resulting from added weighting agents, such as barite (barium sulfate), can significantly affect the response characteristics of one or more of the downhole sensors. In order to obtain accurate and precise measures of parameters of interest computed from these sensor responses, it is necessary to vary the appropriate sensor response models and sensor combination models stored either within the downhole computer 50 or in the second downhole storage means 48. The downlink communication channel 29 provides means for making these parametric changes from the surface without interrupting the drilling operation. For purpose of illustration, changes will be categorized as one of three levels depending upon the amount of data that must be transmitted. As an example, consider a sensor which responds according to a first sensor response model if the drilling mud contains barite and to a second sensor response model if the mud does not contains barite. Both sensor response models are stored in downhole memory. The active sensor response model can therefore be changed by the transmission of a single bit command from the surface. Such changes requiring minimal downlink transmission will be classified as level one.

As a second example, consider a sensor whose response equation comprises a polynomial relationship which is again stored downhole. The coefficients of the terms of the polynomial are a function of the barite content of the mud. The values of the polynomial can be changed based upon prior knowledge of mud barite content by using the downlink telemetry. This requires the transmission of considerably more data than the first example in order to properly define the coefficients and will be classified as level two.

As a third example, consider a plurality of sensors, each of whose response is a function of the barite content of the mud. Here, the entire combination response model which is stored downhole must be varied as a function of the mud barite content. This involves the transmission of a considerable amount of data and will be classified as level three. Downlink transmission can be made during different phases of the drilling operation depending upon the level. As an example, it is desirable to perform level three and possibly level two transmissions when the drill string is not rotating. This minimizes interference from the drill string operational noise, as will be discussed later.

As discussed in previous sections of this disclosure, the amount of raw sensor response data generated per depth interval of borehole greatly exceeds the corresponding volume of parameters of interest or "answer" data computed from the sensor response data.

Using the downhole computer 50 of the current invention to transform raw sensor response data into parameters of interest increases the usage efficiency of limited bandwidth and downhole storage capacity of current MWD systems.

The efficiency of usage can be further increased by using data acquisition management and data transmission management techniques for various classes of MWD parameters as discussed below. For purposes of discussion, the classes of MWD parameters of interest are divided into three categories: (1) formation evaluation, (2) drilling dynamics and (3) bottom hole assembly operations. Formation evaluation parameters include formation porosity, hydrocarbon saturation, lithology, rock properties, formation dip and the like. Drilling dynamics include directional information, information concerning drill bit wear, bit vibration and stand-off from the borehole, torque, weight on the bit, speed of rotation, temperature, pressure inside and outside of the drill string, and indications of bounce, sticking and slipping of the drill bit.

The first two classes of MWD data are usually tracked as a function of corresponding depth within the borehole. In operating MWD systems which comprise sensors to measure a variety of parameters, it is usually not necessary to measure, process, telemeter and/or store the maximum amount of formation evaluation information while the bit is penetrating the targeted formation. Also, the information concerning drilling dynamics may be of secondary importance. Additionally, when penetrating formations of little commercial potential such as thick shales, drilling dynamics information and possibly directional information may be of primary importance while formation evaluation parameters are of secondary importance. When the borehole direction is being changed and the drill string is not rotating, directional information is critical, while formation evaluation parameters are of secondary importance. During drill stem testing operations, bottom hole assembly operations measurements are the prime parameters of interest while formation evaluation and drilling dynamics measurements are not needed.

This invention allows the driller to control, in real-time from the surface, the acquisition and transmission of the three classes of parameters of interest. This option is provided by the downlink telemetry means between the surface and the downhole subassembly containing the sensors. The driller can select with downlink commands the sensor measurements and corresponding computed parameters of interest to be transmitted to the surface, or stored downhole, depending upon the particular phase of the drilling operation. As an example, the acquisition and transmission of formation evaluation parameters can be activated and the acquisition and transmission of drilling dynamics and bottom hole assembly parameters can be suppressed by surface commands transmitted over the downlink telemetry means. This devotes the full band width capacity and the downhole storage capacity of the system to formation evaluation parameters, thereby yielding maximum vertical resolution of formation parametric measurements. Similar selection commands can be sent to optimize drilling dynamics measurements or bore hole assembly operations measurements, or any desired combination of the three classes of MWD measurements. In some circumstances, it might be desirable to telemeter only the selected parameters of interest and store downhole all parameters of interest for subsequent retrieval at the surface.

In summary, the current invention employs a two-way communication system between the surface and the downhole sensors of the MWD system. The uplink portion comprises any type of MWD telemetry system, such as a mud pulse system, to telemeter to the surface parameters of interest computed downhole from the measured sensor response data. The downlink portion provides means for sending selection commands to the downhole elements of the system. These commands define which specific parameters of interest are to be telemetered to the surface, or optionally stored in downhole memory, or both. The telemetry downlink allows data acquisition management and data transmission management techniques to be employed, thereby further optimizing the use of available capacity of the uplink telemetry as well as downhole storage capacity. The downlink also provides means for varying parameters of the sensor response models and the sensor combination models as a function of mud weight, mud chemistry, mud resistivity, or any other parameter which affects sensor response and which is measured at the surface. Furthermore, drilling parameters such as weight on bit and torque, which are measured at the surface, can be telemetered to the downhole subassembly for use in maximizing the effectiveness of the drilling operation.

SUMMARY

Several embodiments and applications of the invention have been disclosed, either briefly or in detail using examples. There are additional embodiments and applications of the invention which will be recognized by those skilled in the arts. Some additional applications can alternatively be summarized by categorizing inputs to the downhole computer 50, outputs from the downhole computer 50 and benefits derived from the outputs of the downhole computer 50.

The downlink element of the two-way communication system can be used to input data into the downhole computer 50. Such data includes, but is not limited to, real time data management commands which optimize the use of the downhole storage capacity and the uplink telemetry capacity of the system. Measurements made at the surface can also be input into the downhole computing means. Such data comprises mud information, absolute depth measurements, and other measurements which are made at the surface and are utilized in subsequent downhole calculations.

Measurements from downhole sensors can provide formation evaluation input data to the downhole computer 50. Formation evaluation input data include responses of electromagnetic sensors comprising multiple antenna, multiple receivers and multiple transmitter-receiver configurations. The response data include the amplitude and phase of electromagnetic energy emitted from transmitters as pulses or compensated waves. Formation evaluation input data further include responses of nuclear sensors. Such sensors can comprise either continuous or pulsed sources of neutrons and detectors which respond to thermal neutrons, epithermal neutrons, fission neutrons and to capture inelastic scatter gamma radiation resulting from the neutrons interacting with nuclei in the borehole environs. Nuclear sensors can also comprise continuous or pulsed sources of gamma radiation and detectors which respond to gross gamma radiation or the energy spectra of gamma radiation induced by these sources within the borehole environs. Nuclear sensors can further comprise gamma ray detectors which respond to the gross or energy spectrum of natural gamma radiation present within the borehole environs. Multiple nuclear sensors can be employed. Formation evaluation input data still further includes the responses of one or more acoustic sensors. Such sensors comprise one or more transmitters which emit focused or non-focused pulses or trains of acoustic energy into the borehole environs and receivers which respond to the amplitudes and travel times of various acoustic wave components induced within the borehole environs. Transmitters can emit energy at one or more frequencies and one or more transmitter-receiver spacings can be employed.

Measurements from downhole sensors can provide directional input data for the downhole computer 50. Directional sensors can respond to acceleration, pressure, temperature, flow of fluids into and out of the borehole, orientation of the downhole assembly within the borehole, internal navigation signals and the strike and dip of beds penetrated by the drill bit.

Downhole sensors also provide a plurality of drilling dynamics input data for the downhole computer 50. These data include mud properties such as the temperature and pressure of the mud within and outside of the downhole subassembly. Drilling dynamics sensors also respond to weight on the drill bit, the speed of rotation of the drill bit, as well as acceleration, torque, vibration and stand-off of the drill bit.

Downhole sensors also provide input data for the downhole computer 50 pertinent to various bottom hole assembly operations including formation testing and controlled drill bit steering.

Data from external sources can be input to the downhole computer 50. These data can comprise offset well log data, seismic data and directional well plan data which are stored within downhole memory means for retrieval as needed by the downhole computer 50.

Outputs from the Downhole Computer

The aforementioned data inputs to the downhole computer 50 are used to derive environmental parameters of interest. These parameters include, but are not limited to, properties of the mud, porosity of the formation, bulk density of the formation, liquid hydrocarbon saturation of the formation, gas saturation of the formation, rock properties of the formation, photoelectric factor of the formation, concentrations of elements within the formation, eccentricity of the downhole subassembly within the borehole, conditions of the drill bit, whirl of the drill bit, the efficiency of the drilling operation, bending of the drill string, rugosity and shape of the borehole, bit bounce, sticking and slippage of the drill string, the presence and thickness of mud cake, and formation permeability.

Benefits of the Derived Parameters of Interest

The use of multiple sensors allows some of the measurements mentioned above to be "over-sampled", since computations are performed downhole. This permits the use of various data analysis techniques to be employed which results in improved precision, accuracy and vertical resolution of the derived parameter or parameters of interest. Computations downhole reduce the volume of measured or "raw" sensor data to less voluminous "answer" data thereby maximizing the use of available uplink telemetry and downhole storage capacity. Drilling efficiency is also improved in that the system allows the telemetry of drilling related information to the surface in real time thereby allowing the drilling operation to be modified as needed. This capability also increases the overall reliability of the tool string. Parameters which are indicative of the operational "health" of the downhole sensors or any other element of the downhole assembly can be telemetered to the surface in real time.

The uplink element of the telemetry unit 42 also permits real time decisions concerning bottom hole operations to be made. Such decisions include changing drilling dynamics, confirming various bottom hole operations, and modifying the drilling program for safety reasons. Real time drilling dynamics and formation evaluation parameters can be used in geosteering of the drill bit.

By employing multiple types of sensors 52 downhole and by calculating parameters of interest from the responses of these sensors downhole, parallel computational techniques and parallel response correction techniques can be employed, thereby increasing the accuracy and precision of the derived parameters of interest. Increased accuracy, precision and vertical resolution of formation evaluation-type parameters of interest reduces the need for comparable wireline measurements after drilling has been terminated. In addition, it is advantageous to make many formation evaluation-type measurements while drilling before the drilling fluid significantly invades the virgin formation.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A measurement-while-drilling downhole assembly for drilling a borehole through earth formations, comprising:
   (a) a plurality of formation evaluation sensors for providing measurements relating to characteristics of the earth formations surrounding the drilling assembly during drilling of the borehole;
   (b) a plurality of programs carried by the downhole assembly for manipulating data downhole;
   (c) a processor in the downhole assembly, said processor utilizing the plurality of programs computing downhole during the drilling of the borehole a plurality of answers relating to the earth formations penetrated by the drilling assembly
   (d) a memory device carried by the drilling assembly for storing the answers downhole; and
   (e) a steering device for altering drilling direction of the borehole in response to said plurality of answers.

2. The downhole assembly of claim 1, wherein the plurality of programs contain response relationships for a combination of sensors in said plurality of sensors to transform the measurements from said plurality of formation evaluation sensors into the plurality of answers.

3. The downhole assembly of claim 2, wherein the response relationships include a predetermined matrix relationship.

4. The downhole assembly of claim 2, wherein the response relationship includes a predetermined look-up table.

5. The downhole assembly of claim 1, wherein the processor computes the value of each answer in said plurality of answers corresponding to the depth of the borehole being drilled by the drilling assembly.

6. The downhole assembly of claim 1, wherein the processor is adapted to alter sensor response models in response to remote signals received by the downhole assembly during drilling of the borehole.

7. The downhole assembly of claim 1 further comprising an uplink telemetry device and wherein the processor transmits the answers to a remote location via the uplink telemetry device.

8. The downhole assembly of claim 1, wherein the downhole assembly is adapted to be conveyed into the borehole by a tubing conveyed from a surface location.

9. The downhole assembly of claim 1, wherein the plurality of answers are selected from a group consisting of (i) formation resistivity; (ii) water saturation of formations along the borehole; (iii) recovery factor index; (iv) formation porosity; (v) estimate of movable hydrocarbons from selected formations along the borehole and (vi) density of the formations.

10. The downhole assembly of claim 1 further including a position measuring device for determining location of the downhole assembly in the borehole during drilling of the borehole.

11. The downhole assembly of claim 10, wherein the processor causes the stabilizers to change drilling direction in response to measurements from the position measuring device.

12. The downhole assembly of claim 1, wherein the steering device is selected from a group consisting of (i) a plurality of independently adjustable ribs and (ii) a plurality of independently adjustable stabilizers.

13. A measurement-while-drilling downhole assembly for drilling a borehole through earth formations, comprising:
   (a) a plurality of formation evaluation sensors for providing measurements relating to characteristics of the earth formations surrounding the drilling assembly during drilling of the borehole;
   (b) a plurality of programs carried by the downhole assembly for manipulating data downhole, said plurality of programs containing response relationships including a look-up table and formation reference data, said plurality of programs being operatively associated with a combination of sensors in said plurality of formation evaluation sensors to transform the measurements from said plurality of formation evaluation sensors into the plurality of answers;
   (c) a processor in the downhole assembly, said processor utilizing the plurality of programs computing downhole during the drilling of the borehole a plurality of answers relating to the earth formations penetrated by the drilling assembly; and (d) a memory device carried by the drilling assembly for storing the answers downhole.

14. The downhole assembly of claim 13, wherein the response relationships include a predetermined matrix relationship.

15. The downhole assembly of claim 13, wherein the processor computes the value of each answer in said plurality of answers corresponding to the depth of the borehole being drilled by the drilling assembly.

16. The downhole assembly of claim 13, wherein the processor is adapted to alter sensor response models in response to remote signals received by the downhole assembly during drilling of the borehole.

17. The downhole assembly of claim 13 further comprising an uplink telemetry device and wherein the processor transmits the answers to a remote location via the uplink telemetry device.

18. The downhole assembly of claim 13, wherein the downhole assembly is adapted to be conveyed into the borehole by a tubing conveyed from a surface location.

19. The downhole assembly of claim 13, wherein the plurality of answers are selected from a group consisting of (i) formation resistivity; (ii) water saturation of formations along the borehole; (iii) recovery factor index; (iv) formation porosity; (v) estimate of movable hydrocarbons from selected formations along the borehole and (vi) density of the formations.

20. The downhole assembly of claim 13 further including a position measuring device for determining location of the downhole assembly in the borehole during drilling of the borehole.

21. The downhole assembly of claim 20 further comprising a steering device for altering drilling direction of the borehole.

22. The downhole assembly of claim 21, wherein the processor causes the steering device to change drilling direction in response to measurements from the position measuring device.

23. The downhole assembly of claim 22, wherein the steering device is selected from a group consisting of (i) a plurality of independently adjustable ribs and (ii) a plurality of independently adjustable stabilizers.

24. A steerable drilling assembly for drilling a borehole through earth formations, comprising:
(a) a downhole MWD assembly comprising
   (i) a plurality of formation evaluation sensors for providing measurements relating to characteristics of the earth formations surrounding the drilling assembly during drilling of the borehole;
   (ii) a plurality of programs carried by the downhole MWD assembly for manipulating data downhole, said plurality of programs containing response relationships including a look-up table and formation reference data, said plurality of programs being operatively associated with a combination of sensors in said plurality of formation evaluation sensors to transform the measurements from said plurality of formation evaluation sensors into the plurality of answers;
(b) a processor in the downhole drilling assembly adapted to utilize the plurality of programs to compute downhole during the drilling of the borehole a plurality of answers relating to the earth formations penetrated by the drilling assembly;
(c) a memory device carried by the drilling assembly for storing the answers downhole; and
(d) a steering device for altering drilling direction of the borehole in response to said plurality of answers.

25. The drilling assembly of claim 24, wherein the response relationships include a predetermined matrix relationship.

26. The drilling assembly of claim 24, wherein the processor computes the value of each answer in said plurality of answers corresponding to the depth of the borehole being drilled by the drilling assembly.

27. The drilling assembly of claim 24, wherein the processor is adapted to alter sensor response models in response to remote signals received by the drilling assembly during drilling of the borehole.

28. The drilling assembly of claim 24 further comprising an uplink telemetry device and wherein the processor transmits the answers to a remote location via the uplink telemetry device.

29. The drilling assembly of claim 24, wherein the drilling assembly is adapted to be conveyed into the borehole by a tubing conveyed from a surface location.

30. The drilling assembly of claim 24, wherein the plurality of answers are selected from a group consisting of (i) formation resistivity; (ii) water saturation of formations along the borehole; (iii) recovery factor index; (iv) formation porosity; (v) estimate of movable hydrocarbons from selected formations along the borehole and (vi) density of the formations.

31. The drilling assembly of claim 24 further including a position measuring device for determining location of the drilling assembly in the borehole during drilling of the borehole.

32. The drilling assembly of claim 31, wherein the processor causes the steering device to change drilling direction in response to measurements from the position measuring device.

33. The drilling assembly of claim 32, wherein the steering device is selected from a group consisting of (i) a plurality of independently adjustable ribs and (ii) a plurality of independently adjustable stabilizers.

34. A measurement-while-drilling drilling assembly for drilling a borehole through earth formations, comprising:
(a) a plurality of formation evaluation sensors for providing measurements relating to characteristics of the earth formations surrounding the drilling assembly during drilling of the borehole;
(b) a first memory device containing values representing predetermined formation reference data;
(c) a processor in the drilling assembly, said processor utilizing a plurality of programs for comparing the measured formation characteristics with the predetermined formation characteristics and for computing downhole during the drilling of the borehole a plurality of answers relating to the earth formations penetrated by the drilling assembly; and
(d) a second memory device carried by the drilling assembly for storing the answers downhole,
wherein the processor is operatively associated with the first memory device for updating sensor response models during drilling.

35. The drilling assembly of claim 34, wherein the plurality of programs contain response relationships for a combination of sensors in said plurality of sensors to transform the measurements from said plurality of formation evaluation sensors into the plurality of answers.

36. The drilling assembly of claim 34, wherein the processor is adapted to alter sensor response models in response to remote signals received by the drilling assembly during drilling of the borehole.

37. The drilling assembly of claim 34 further comprising an uplink telemetry device and wherein the processor transmits the answers to a remote location via the uplink telemetry device.

38. The drilling assembly of claim 34, wherein the plurality of answers are selected from a group consisting of (i) formation resistivity; (ii) water saturation of formations along the borehole; (iii) recovery factor index; (iv) formation porosity; (v) estimate of movable hydrocarbons from selected formations along the borehole and (vi) density of the formations.

39. The drilling assembly of claim 34 further including a position measuring device for determining location of the drilling assembly in the borehole during drilling of the borehole.

40. The drilling assembly of claim 39 further comprising a steering device stabilizers for altering drilling direction of the borehole.

41. The drilling assembly of claim 40, wherein the processor causes the steering device to change drilling direction in response to measurements from the position measuring device.

42. The drilling assembly of claim 40, wherein the steering device is selected from a group consisting of (i) a plurality of independently adjustable ribs and (ii) a plurality of independently adjustable stabilizers.

43. A method for drilling a borehole through earth formations, comprising:
 (a) measuring characteristics of the earth formations surrounding a downhole assembly of drilling assembly during drilling of the borehole with a plurality of formation evaluation sensors;
 (b) manipulating data representative of the measured characteristics downhole using a plurality of programs carried by the downhole assembly for manipulating data downhole;
 (c) computing downhole during the drilling of the borehole a plurality of answers relating to the earth formations penetrated by the drilling assembly;
 (d) storing the answers downhole in a memory device; and
 (e) altering drilling direction of the borehole using a steering device responsive to said plurality of answers.

44. The method of claim 43 further comprising transforming the measurements from the plurality of formation evaluation sensors into the plurality of answers using response relationships for a combination of sensors in the plurality of sensors contained in the plurality of programs.

45. The method of claim 44, wherein the response relationships include a predetermined matrix relationship.

46. The method of claim 44, wherein the response relationship includes a predetermined look-up table.

47. The method of claim 43 further comprising computing with the processor a value representative of each answer in said plurality of answers corresponding to the depth of the borehole being drilled by the drilling assembly.

48. The method of claim 43 further comprising altering formation models using the processor in response to remote signals received by the downhole assembly during drilling of the borehole.

49. The method of claim 43 further comprising transmitting the answers to a remote location using an uplink telemetry device.

50. The method of claim 43, further comprising conveying the downhole assembly into the borehole from a surface location using a tubing.

51. The method of claim 43, further comprising selecting the plurality of answers from a group consisting of (i) formation resistivity; (ii) water saturation of formations along the borehole; (iii) recovery factor index; (iv) formation porosity; (v) estimate of movable hydrocarbons from selected formations along the borehole and (vi) density of the formations.

52. The method of claim 43 further including determining location of the downhole assembly in the borehole during drilling of the borehole using a position measuring device.

53. The method of claim 52, wherein the processor is used to cause the steering device to change drilling direction in response to measurements from the position measuring device.

54. The method of claim 53 wherein the steering device is selected from a group consisting of (i) a plurality of independently adjustable ribs and (ii) a plurality of independently adjustable stabilizers.

55. A method for drilling a borehole through earth formations, comprising:
 (a) measuring characteristics of the earth formations surrounding a downhole assembly of drilling assembly during drilling of the borehole with a plurality of formation evaluation sensors;
 (b) manipulating data downhole using a plurality of programs containing response relationships including a look-up table and formation reference data, said plurality of programs being operatively associated with a combination of sensors in said plurality of formation evaluation sensors;
 (c) computing downhole during the drilling of the borehole a plurality of answers relating to the earth formations penetrated by the drilling assembly; and
 (d) storing the answers downhole in a memory device.

56. The method of claim 55, further comprising computing with the processor a value representative each answer in said plurality of answers corresponding to the depth of the borehole being drilled by the drilling assembly.

57. The method of claim 55 further comprising altering sensor response models in response to remote signals received by the downhole assembly during drilling of the borehole using the processor.

58. The method of claim 55 further comprising transmitting the answers to a remote location using an uplink telemetry device.

59. The method of claim 55, wherein the plurality of answers computed are selected from a group consisting of (i) formation resistivity; (ii) water saturation of formations along the borehole; (iii) recovery factor index; (iv) formation porosity; (v) estimate of movable hydrocarbons from selected formations along the borehole and (vi) density of the formations.

60. The method of claim 55 further comprising determining location of the downhole assembly in the borehole during drilling of the borehole using a position measuring device.

61. The method of claim 60 further comprising altering drilling direction of the borehole using a steering device in response to measurements from the position measuring device.

62. The method of claim 61 wherein the steering device is selected from a group consisting of (i) a plurality of independently adjustable ribs and (ii) a plurality of independently adjustable stabilizers.

63. A method for drilling a borehole through earth formations, comprising:
 (a) measuring characteristics of the earth formations surrounding a downhole assembly of drilling assembly during drilling of the borehole with a plurality of formation evaluation sensors;

(b) manipulating data downhole using a plurality of programs containing response relationships including a look-up table and formation reference data, said plurality of programs being operatively associated with a combination of sensors in said plurality of formation evaluation sensors;

(c) computing downhole during the drilling of the borehole a plurality of answers relating to the earth formations penetrated by the drilling assembly; and (d) storing the answers downhole in a memory device; and (e) altering drilling direction of the borehole in response to said plurality of answers.

64. The method of claim 63, wherein the response relationships include a predetermined matrix relationship.

65. The method of claim 63, further comprising computing with the processor a value representative each answer in said plurality of answers corresponding to the depth of the borehole being drilled by the drilling assembly.

66. The method of claim 63 further comprising altering sensor response models in response to remote signals received by the downhole assembly during drilling of the borehole using the processor.

67. The method of claim 63 further comprising transmitting the answers to a remote location using an uplink telemetry device.

68. The method of claim 63, wherein the plurality of answers computed are selected from a group consisting of (i) formation resistivity; (ii) water saturation of formations along the borehole; (iii) recovery factor index; (iv) formation porosity; (v) estimate of movable hydrocarbons from selected formations along the borehole and (vi) density of the formations.

69. The method of claim 63 further comprising determining location of the downhole assembly in the borehole during drilling of the borehole using a position measuring device.

70. The method of claim 69 wherein the steering device is responsive to measurements from the position measuring device.

71. The method of claim 70 wherein the steering device is selected from a group consisting of (i) a plurality of independently adjustable ribs and (ii) a plurality of independently adjustable stabilizers.

72. A method for drilling a borehole through earth formations, comprising:

(a) measuring characteristics of the earth formations surrounding a downhole assembly of drilling assembly during drilling of the borehole with a plurality of formation evaluation sensors;

(b) storing values representative of predetermined formation reference data into a first memory device;

(c) comparing the measured formation characteristics with the values using a processor in the downhole assembly;

(d) computing downhole during the drilling of the borehole a plurality of answers relating to the earth formations penetrated by the drilling assembly; and (e) a second memory device carried by the drilling assembly for storing the answers downhole; and (f) updating sensor response models during drilling in response to remote signals received by the downhole assembly during drilling of the borehole.

73. The method of claim 72 further comprising transforming the measurements from said plurality of formation evaluation sensors into the plurality of answers using the plurality of programs, wherein the plurality of programs contain response relationships including the sensor response models relating to a combination of sensors in said plurality of sensors.

74. The method of claim 73, wherein the response relationships include a predetermined matrix relationship.

75. The method of claim 73, wherein the response relationship includes a predetermined look-up table.

76. The method of claim 72 further comprising computing the value of each answer in said plurality of answers corresponding to the depth of the borehole being drilled by the drilling assembly using the processor.

77. The method of claim 72 further comprising transmitting the answers to a remote location using an uplink telemetry device.

78. The method of claim 72 further comprising selecting the plurality of answers from a group consisting of (i) formation resistivity; (ii) water saturation of formations along the borehole; (iii) recovery factor index; (iv) formation porosity; (v) estimate of movable hydrocarbons from selected formations along the borehole and (vi) density of the formations.

79. The method of claim 72 further including determining location of the downhole assembly in the borehole during drilling of the borehole using a position measuring device.

80. The method of claim 79 further comprising drilling direction of the borehole using a steering device responsive to measurements from the position measuring device.

81. The method of claim 80 wherein the steering device is selected from a group consisting of (i) a plurality of independently adjustable ribs and (ii) a plurality of independently adjustable stabilizers.

* * * * *